United States Patent
Kharkover

(10) Patent No.: US 8,457,780 B2
(45) Date of Patent: Jun. 4, 2013

(54) METHOD AND SYSTEM FOR ENABLING AUTOMATED RECEIVING AND RETRIEVING OF CARGO FOR STORING PURPOSES

(76) Inventor: Ilia Kharkover, Qiryat Yam (IL)

(*) Notice: Subject to any disclaimer, the term of this patent is extended or adjusted under 35 U.S.C. 154(b) by 485 days.

(21) Appl. No.: 12/741,608

(22) PCT Filed: Nov. 9, 2008

(86) PCT No.: PCT/IL2008/001473
§ 371 (c)(1),
(2), (4) Date: May 6, 2010

(87) PCT Pub. No.: WO2009/060458
PCT Pub. Date: May 14, 2009

(65) Prior Publication Data
US 2010/0228386 A1 Sep. 9, 2010

Related U.S. Application Data

(60) Provisional application No. 60/996,267, filed on Nov. 8, 2007.

(51) Int. Cl.
G06F 7/00 (2006.01)
B65G 1/00 (2006.01)

(52) U.S. Cl.
USPC .......... 700/217; 700/214; 700/216; 700/218; 700/228; 700/230; 414/282; 414/286; 414/279; 414/280; 414/227

(58) Field of Classification Search
None
See application file for complete search history.

(56) References Cited

U.S. PATENT DOCUMENTS

| 4,773,807 A * | 9/1988 | Kroll et al. ................ 414/282 |
| 5,669,753 A | 9/1997 | Schween |
| 6,851,921 B2 | 2/2005 | Haag |
| 2003/0198539 A1 | 10/2003 | Hagenzieker |
| 2007/0031218 A1 * | 2/2007 | Haag ............................ 414/227 |

FOREIGN PATENT DOCUMENTS

WO  WO 2007/135655  11/2007

* cited by examiner

Primary Examiner — Gene Crawford
Assistant Examiner — Yolanda Jones
(74) Attorney, Agent, or Firm — The Law Office of Michael E. Kondoudis

(57) ABSTRACT

The invention relates to a system of enabling automated receiving/retrieving of stocks of cargo for storing purposes. The system uses at least one service level and one or more storage levels. The service level is operated and organized in such a way that it is able to receive, interchange cargo, and extract cargo simultaneously and batch way. The system is redundant and allows continued operation even if some of its components malfunction. The service area comprising (a) a plurality of pallets for conveying said cargo; (b) a matrix of blocks of predetermined shape upon which said cargo and said pallets located; (c) at least one elevator block for transporting said pallet to different areas of said system; (d) at least one box; (e) at least two buffer for allowing transport of said pallets in at least two orthogonal directions in each of said areas.

15 Claims, 22 Drawing Sheets

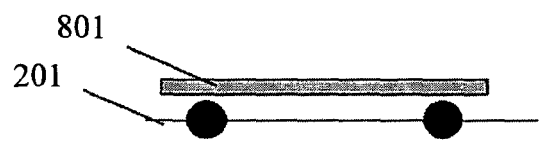
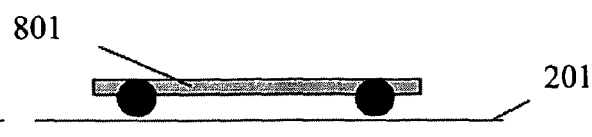
FIG. 3(A)　　　　　　　FIG. 3(B)
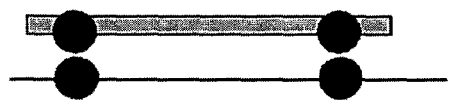
FIG. 3(C)　　　　　　　FIG. 3(D)
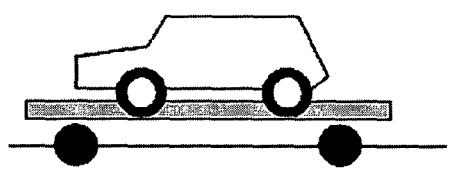
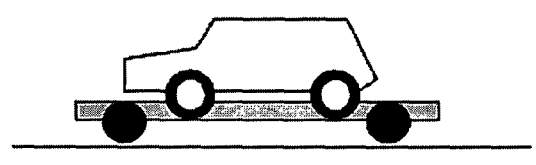
FIG. 3(E)　　　　　　　FIG. 3(F)

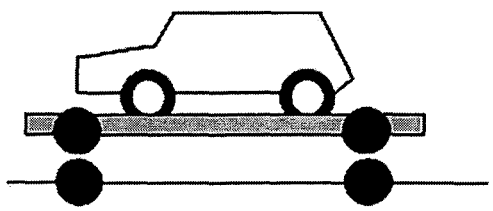
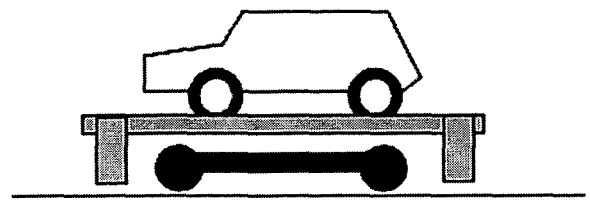
FIG. 3(G)　　　　　　　　　FIG. 3(H)
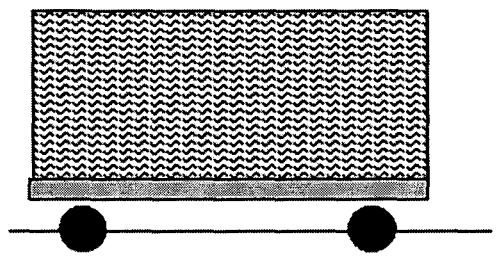
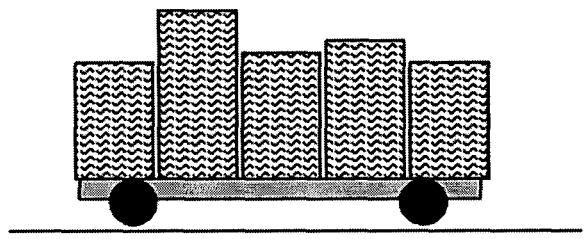
FIG. 3(I)　　　　　　　　　FIG. 3(J)
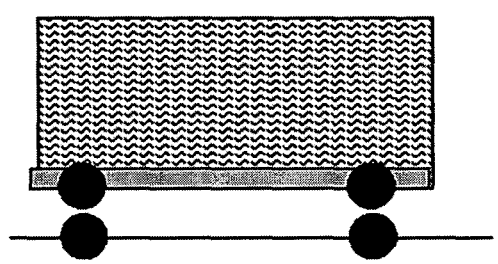
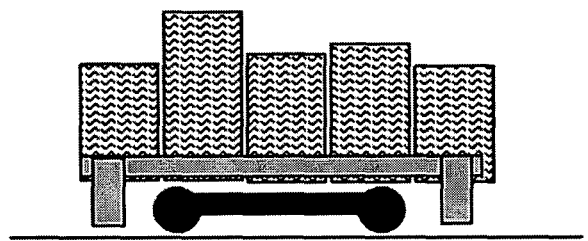
FIG. 3(K)　　　　　　　　　FIG. 3(L)

 
FIG. 4(A)       FIG 4(B)
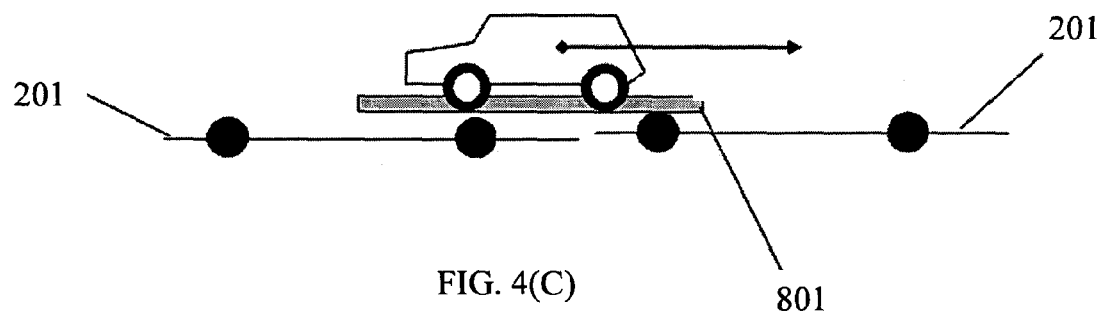
FIG. 4(C)
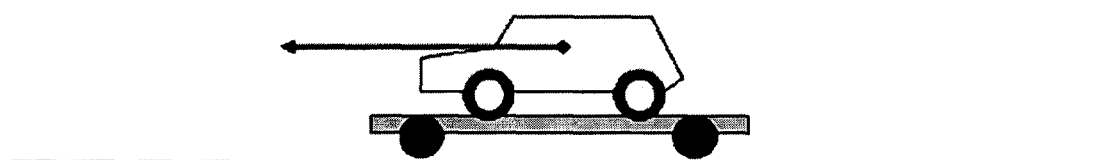
FIG. 4(D)

METHOD AND SYSTEM FOR ENABLING AUTOMATED RECEIVING AND RETRIEVING OF CARGO FOR STORING PURPOSES

FIELD OF THE INVENTION

This invention relates to automatic receiving and retrieving of cargo for storing purposes.

BACKGROUND OF THE INVENTION

Globalization and relentless world population increase force a consequent rising trend in real estate prices, especially acute in central and prestigious areas of large cities, for example.

The constant growth in demand, shortage of available land for construction, and the inexorable industrialization and modernization of large populations (e.g. China, India) serve to exacerbate the problem of s parking spaces and to increase the price of parking a vehicle.

The necessity for parking spaces stands out in business centers (market segment A), commercial centers (market segment B) and residential areas (market segment C), and in combinations thereof. It will be appreciated that there are other areas which suffer from parking space shortages and in which allocating physical resources for additional parking areas is a challenge, especially considering the amount of space that is required for parking each car and allowing access in and out of the car.

Apart from the need to make the most out of the precious area of land that is allocated for parking cars, as an example, or for mass storage in the broader sense, there is an issue of providing efficient service, such that a vehicle (as an example) wishing to enter or exit a parking facility are delayed as little as possible. In this context it is noted that different storage facilities and parking facilities in particular have recurring service patterns which are characterized by different storage and removal rates at specific times of day. A parking complex for a business center, for example, should be capable of handling the reception of a large inflow of vehicles to be stored at the beginning of the workday, should be capable of providing a large storage space utilization during the workday without severely compromising service time, and should be capable of handling the release of a large flow of vehicles at the end of the workday.

A parking complex for a commercial center (market segment B) should be capable of handling the reception of a large flow of vehicles in a short period of time at the beginning of the workday, should be capable of providing short service time for simultaneous reception/release of vehicles during the workday, and should be capable of handling the release of a large flow of vehicles in a short period of time at the end of the workday.

A parking complex for a residential center (market segment C) should be capable of handling the release of a large flow of vehicles in a short period of time at the beginning of the workday, should be capable of providing rapid simultaneous reception/release of vehicles throughout the day, and good storage space utilization during the night. All of the above systems must also of course deal with some degree of storage and removal episodes occurring at random times throughout the day and possibly night, and will preferably provide a minimized wait time for removal of a stored item.

U.S. Pat. No. 5,669,753 provides an automated parking garage which simultaneously parks and retrieves multiple vehicles. Upon being granted entry, a customer parks his/her vehicle on a pallet near the garage entrance and leaves the facility. In single floor designs, the pallet is carried by a self-propelled carrier to a parking space by a series of longitudinal and transverse movements on rails. A multiple story embodiment employs a lifting device that includes a pallet support member that shuttles back and forth between two contiguous floors. Each pallet is carried by a carrier to a lifting device and each lifting device has mechanical arms that support the carrier until the pallet support member deploys and independently supports the pallet to enable withdrawal of the carrier from the lifting device. Another carrier, stationed on an upper floor, retrieves the vehicle-supporting pallet from the lifting device and delivers it to its assigned parking space. Insertion and retrieval of multiple vehicles occurs simultaneously so that the formation of queues of vehicles entering the facility is minimized.

U.S. Pat. No. 6,851,921 provides an automated parking garage comprising a multi-floor building having a plurality of vehicle storage racks in a storage area for storing loaded or unloaded pallets. The entrance-level floor of the building includes an entry/exit station for receiving a vehicle. The garage includes a pallet stacking station for storing the unloaded pallets, located over a shuttle aisle that extends under the entry/exit station. A pallet shuttle traverses the shuttle aisle to a first position under the entry/exit station for handling the unloaded pallet in the entry/exit station, and to a second position under the pallet stacking station for stacking the unloaded pallet. The garage also includes a transport system for transporting the loaded pallet in the storage area.

PCT no. WO07/135,655 (or application no. PCT/IL2006/000589) discloses a system and a method of enabling storage and retrieval of objects. The system includes a storage space, an insertion/extraction block and a controller. The storage includes a plurality of storage blocks. Each of said storage blocks is configured to receive an object for storage thereon. The insertion/extraction blocks are configured to allow an insertion/extraction unit to insert and extract objects from the storage space.

The following application relates to the service level—or in other words to the level of reception and extraction of cargo.

In spite of the above, there is still a long felt need for a novel method and system of enabling retrieval and receiving of objects for enabling storage which is accomplished using a minimum space and requires minimal time due to a matrix layout. Furthermore, there is a long felt need for a system and method of retrieval and accommodation of objects without imposing any restrictions on the type of object stored in said system.

BRIEF DESCRIPTION OF THE DRAWINGS

In order to understand the invention and to see how it may be carried out in practice, reflecting embodiments will now be described, by way of non-limiting example only. These descriptions are not to be taken as the only options of using the invention and not as the most optimal options of using the invention. The descriptions reference to the accompanying drawings, in which:

FIG. 3(A) is a graphical illustration of a pallet without transport mechanisms, while the floor has a transporting mechanism. FIG. 3(B) is a graphical illustration of a pallet with an autonomic transport mechanism, and the floor is without mechanisms. FIG. 3(C) is a graphical illustration of a pallet with an autonomic transport mechanism and the floor also carries a transport mechanism. These mechanisms work in synergy with each other. FIG. 3(D) is a graphical illustration of a pallet without autonomic transport mechanism and the floor is without transport mechanism. A separate mechanism that arrives on the location when necessary exists. This mechanism is used for transporting the pallet from block to block. FIGS. 3(E), 3(F), 3(G), 3(H) are graphical illustrations of different pallets (see above) holding a vehicle.

FIGS. 3(I), 3(J), 3(K), 3(L) are graphical illustrations of different pallets (see above) holding boxes and cargo.

FIGS. 4(A) and 4(B) are graphical illustrations of the difference in the structure of a block. In 4(A) the block includes a transportation mechanism and in 4(B) the block constitutes a floor without mechanisms.

FIG. 4(C) is a graphical illustration of the transportation of a pallet without mechanisms between blocks that have transportation mechanisms.

FIG. 4(D) is a graphical illustration of the transportation of a pallet with transportation mechanisms between blocks without transportation mechanisms.

SUMMARY OF THE INVENTION

Figure 1A:
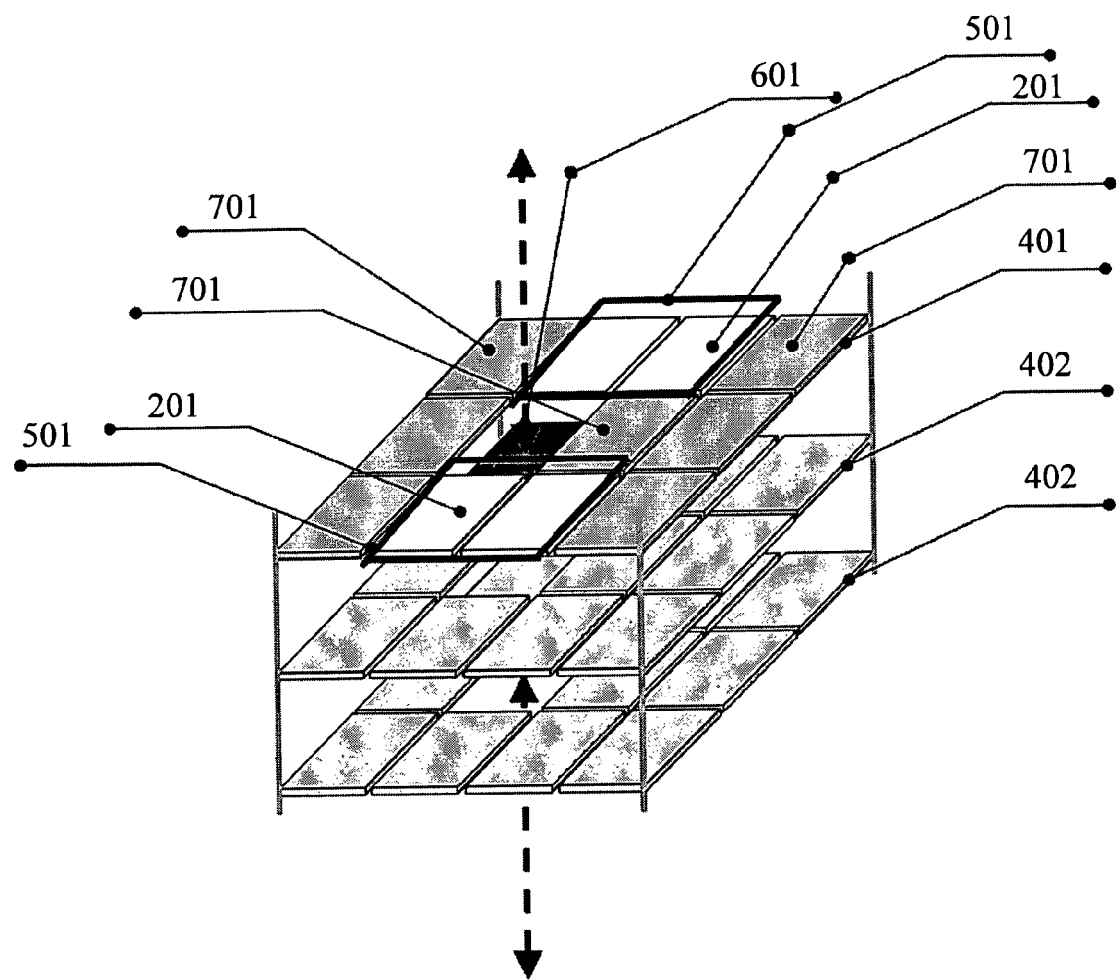
FIGS. 1A-B are three-dimensional graphical illustrations of a service level ("Level X") and storage levels ("Levels S").

The present invention provides a universal robotic storage solution including a logical model for operating an automated retrieval and receiving of object into and out of the system for storage purposes that can be operated in each of the aforementioned market segments as well as in other markets. Throughout the following description of the present invention, reference is made by way of example to a parking facility and to vehicles. It should be appreciated that the present invention is not specifically limited to any particular storage facility, nor to any particular item that is to be stored within and extracted from the storage facility.

It is one object of the present invention to provide in an automated cargo storage, receiving and retrieval system having at least one storage area, a service area adapted to receive stocks of cargo being inserted into said system and to retrieve stocks of cargo being extracted out of said system, said service area comprising:
  a. a plurality of pallets adapted for conveying said cargo;
  b. a matrix of blocks, said blocks being of predetermined shape upon which said cargo and said pallets may be located; each of said blocks is selected from a group consisting of transport block, elevator block or one block of an insertion/extraction block set;
  c. at least one elevator block for transporting said pallet to different areas of said system;
  d. at least one box comprising at least one insertion/extraction block set; said insertion/extraction block set comprises one or more adjacent blocks, said insertion/extraction block set are provided with means adapted to receive entering cargo into said system upon said pallets, and means adapted to release said cargo from said system;
  e. at least two buffer comprising at least one of said transport blocks, said buffer being adapted to allow transport of said pallets in at least two orthogonal directions in each of said areas;
  said pallets, said buffer, said elevator block and said insertion/extraction block set are adapted to perform said storage, receiving and retrieval of said cargo in a sequence such that said cargo can be received into said system and other cargos can be extracted from said system simultaneously.

It is another object of the present invention to provide the automated cargo storage, receiving and retrieval system as defined above, wherein said service area may continue operation even in the case of failure of fewer than all of said elevators, fewer than all of said insertion/extraction block set, fewer than all of said buffers or any combination thereof.

It is another object of the present invention to provide the automated cargo storage, receiving and retrieval system as defined above, wherein said buffer and/or said elevator are used for temporary storage of said cargo.

It is another object of the present invention to provide the automated cargo storage, receiving and retrieval system as defined above, wherein said elevator is provided with exit and entrance doors in more than one direction such that more possibilities of transporting said pallets are provided so as more transporting paths are provided.

It is another object of the present invention to provide the automated cargo storage, receiving and retrieval system as defined above, wherein said service area additionally comprising a controller for controlling the movements of said pallets and elevator block. It is another object of the present invention to provide the automated cargo storage, receiving and retrieval system as defined above, wherein said controller is adapted to cause said pallets to move independently.

It is another object of the present invention to provide the automated cargo storage, receiving and retrieval system as defined above, wherein said predetermined shape of each of said blocks is selected from a group consisting of rectangular, circular, triangle, 2D or 3D configuration, and any multi-dimensional configuration regular or irregular shape of any size, shape or type.

It is another object of the present invention to provide the automated cargo storage, receiving and retrieval system as defined above, wherein the shape of each of said block is substantially different.

It is another object of the present invention to provide the automated cargo storage, receiving and retrieval system as defined above, wherein said controller operates in at least one of three modes at any given time, said modes are selected from a group consisting of:
  a. reception mode, adapted to (i) receive said cargo into said insertion/extraction block set, transfer said cargo through said elevator to said storage area of said cargo storage, receiving and retrieval system via said plurality of transport blocks; and (ii) transfer empty pallets back through said elevator to said insertion/extraction block via substantially different transport blocks;
  b. extraction mode, adapted to (i) serially release cargo from said storage area of said cargo storage, receiving and retrieval system via said plurality of said transport blocks and out of said system through said insertion/extraction block set; and, (ii) transfer empty pallets back from said insertion/extraction block set via substantially different transport blocks to said storage area;
  c. tradeoff mode, adapted to simultaneously (i) release said cargo through one of said insertion/extraction block set out of said system; and, (ii) receive new cargo through another insertion/extraction block set for storage whilst using different transport routes for said storage and said release of said cargo.

It is another object of the present invention to provide the automated cargo storage, receiving and retrieval system as defined above, wherein a controller is adapted to switch between said reception mode, said extraction mode and said tradeoff mode according to predetermined criteria It is another object of the present invention to provide the automated cargo storage, receiving and retrieval system as defined above, wherein said predetermined criteria is selected from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

It is another object of the present invention to provide the automated cargo storage, receiving and retrieval system as defined above, wherein said service area is provided with at least two of said elevator blocks and at least two of said insertion/extraction block sets, wherein said service area may continue operation even in the case of failure of fewer than all of said elevators, fewer than all of said insertion/extraction block set, fewer than all of said buffers or any combination thereof.

It is another object of the present invention to provide the automated cargo storage, receiving and retrieval system as defined above, wherein said controller is adapted to prioritize pending extraction requests for extracting said cargo from the storage spaces and/or to assign pending insertion requests to the storage spaces in accordance with predetermined criteria.

It is another object of the present invention to provide the automated cargo storage, receiving and retrieval system as defined above, wherein said predetermined criteria is selected from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

It is another object of the present invention to provide the automated cargo storage, receiving and retrieval system as defined above, wherein said system comprises of a plurality of storage areas and wherein each storage area includes one or more storage spaces.

It is another object of the present invention to provide a method for operating a service area in an automated cargo storage, receiving and retrieval system, said service area being adapted for receiving cargo being inserted into said system and to retrieving cargo being extracted out of said system. The method comprises steps selected inter alia from:
  a. providing a plurality of pallets adapted for conveying said cargo;
  b. providing a matrix of blocks, said blocks being of predetermined shape upon which said cargo and said pallets may be located; each of said blocks is selected from a group consisting of transport block, elevator block or one block of an insertion/extraction block set;
  c. providing at least one elevator block transporting said pallet to different areas of said system;
  d. providing at least one box comprising at least one insertion/extraction block set; said insertion/extraction block set comprises one or more adjacent blocks, said insertion/extraction block set are provided with means adapted to receive entering cargo into said system upon said pallets, and means adapted to release said cargo from said system;
  e. providing at least two buffers comprising at least one of said transport blocks, said buffer being adapted to allow transport of said pallets in at least two orthogonal directions in each of said areas;
  f. receiving incoming stocks of cargo at said insertion/extraction block sets upon said pallets;
  g. transporting said stocks of cargo upon said pallets through said transport blocks to the storage area in said cargo storage, receiving and retrieval system;
  h. storing said stocks of cargo in said storage area in said cargo storage, receiving and retrieval system;
  i. transporting stocks of said cargo upon said pallets over said transport blocks from said storage area to said service area via substantially different transport blocks than those used in said step (g) in said cargo storage, receiving and retrieval system; and,
  j. releasing said stocks of cargo from said insertion/extraction block sets of said cargo storage, receiving and retrieval system;

said steps of transporting, releasing and receiving are performed in a sequence such that a stock of said cargo can be received into said system and a stock of cargos can be extracted from said system simultaneously; wherein said steps (i) of transporting said stocks of cargo upon said pallets from said storage area to said service area is performed by substantially different transport blocks than those used in said step (g).

It is another object of the present invention to provide the method as defined above, wherein said step of transporting comprises step of raising or lowering said pallet to different areas of said system.

It is another object of the present invention to provide the method as defined above, additionally comprising step of continuing operation of said service area even in the case of failure of fewer than all of said elevators, fewer than all of said insertion/extraction block set, fewer than all of said buffers or any combination thereof.

It is another object of the present invention to provide the method as defined above, additionally comprising step of temporarily storing said cargo in said buffer and/or said elevator.

It is another object of the present invention to provide the method as defined above, additionally comprising step of providing said elevator with exit and entrance doors in more than one direction such that more possibilities of transporting said pallets are provided so as more transporting paths are provided.

It is another object of the present invention to provide the method as defined above, additionally comprising step of providing at least two said elevator blocks, and providing at least two said insertion/extraction block sets, wherein said service area may continue operation even in the case of failure of one elevator and one insertion/extraction block set.

It is another object of the present invention to provide the method as defined above, additionally comprising step of controlling the movements of said pallets, elevator block, and insertion/extraction block set.

It is another object of the present invention to provide the method as defined above, additionally comprising step of independently moving said pallet, each of said blocks and buffers.

It is another object of the present invention to provide the method as defined above, additionally comprising step of selecting said predetermined spaces of said blocks is selected from a group consisting of rectangular, circular, triangle, 2D or 3D configuration, and any multi-dimensional configuration regular or irregular shape of any size, shape or type.

It is another object of the present invention to provide the method as defined above, additionally comprising step of selecting the shape of each of said block is substantially different.

It is another object of the present invention to provide the method as defined above, additionally comprising step of operating said service area in modes selected from a group consisting of:
  a. reception mode, adapted to (i) receive said cargo into said insertion/extraction block set, transfer said cargo through said elevator to said storage area of said cargo storage, receiving and retrieval system via said plurality of transport blocks; and (ii) transfer empty pallets back through said elevator to said insertion/extraction block via substantially different transport blocks;
  b. extraction mode, adapted to (i) serially release cargo from said storage area of said cargo storage, receiving and retrieval system via said plurality of said transport blocks and out of said system through said insertion/extraction block set; and, (ii) transfer empty pallets back from said insertion/extraction block set via substantially different transport blocks to said storage area; and,
  c. tradeoff mode, adapted to simultaneously (i) release said cargo through one of said insertion/extraction block set out of said system; and, (ii) receive new cargo through another insertion/extraction block set for storage whilst using different transport routes for said storage and said release of said cargo.

It is another object of the present invention to provide the method as defined above, additionally comprising step of switching between said reception mode, said extraction mode and said tradeoff mode according to predetermined criteria.

It is another object of the present invention to provide the method as defined above, additionally comprising step of selecting said predetermined criteria from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

It is another object of the present invention to provide the method as defined above, additionally comprising step of prioritizing pending extraction requests for extracting said cargo from the storage spaces and/or to assigning pending insertion requests to the storage spaces in accordance with predetermined criteria.

It is still an object of the present invention to provide the method as defined above, additionally comprising step of selecting said predetermined criteria from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

It is lastly an object of the present invention to provide the method as defined above, additionally comprising steps of serially receiving said cargo, and serially releasing said cargo out of said system.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide an advanced modular universal matrix-style automated robotic parking and storage system. In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments. Lastly, the terms "comprising", "including", "having", and the like, as used in the present application, are intended to be synonymous.

The term 'tradeoff mode' refers hereinafter to the mode described in FIG. 13.

The term 'reception mode' refers hereinafter to the mode described in FIG. 11.

The term 'extraction mode' refers hereinafter to the mode described in FIG. 12.

The term 'plurality' refers hereinafter to any integer number equal or higher 1, e.g, 2-10, especially 2-4.

The term 'cargo' refers hereinafter to a object to be received, stored and retrieved. In a preferred embodiment the cargo is a vehicle.

The term 'pallet' refers hereinafter to a platform adapted for holding a cargo. The pallet may be provided with transport means allowing it to move. A pallet is adapted to transport cargo placed upon said pallet from one location into the other location.

The term 'block' refers hereinafter to a modular unit from which the storage system is built, consisting of a space large enough to store a cargo either on or off a pallet, and from which a pallet, cargo, or pallet holding a cargo can be transferred to an adjacent block.

The term 'elevator' refers hereinafter to a holding space adapted for movement between different levels or different areas within a level. Said movement can be vertical or horizontal movement between at least two levels.

The term 'buffer' refers hereinafter to an unoccupied block in the parking system, generally reserved for transport of cargo or empty pallets. It should be pointed out that in some cases the buffer may be used to temporally store cargo within.

The term 'box' refers hereinafter to a set of one or more blocks. In the case where more than one block comprises a box, the blocks are neighboring blocks. A box is adapted for receiving/retrieving cargo from outside the system.

The term 'service level' refers hereinafter to a floor of a storage or parking facility adapted for logistical operations of storing and extracting cargos from the storage or parking facility.

The term 'storage level' refers hereinafter to a floor of a storage or parking facility adapted for storing cargo.

The term 'level' refers hereinafter to a physically separated floor of a building or distinct area.

The term 'different levels' refers hereinafter to a substantially two different levels physically separated or two distinct areas.

The present invention provides a service level for an automated storage and retrieval system, suitable for storage of cargo or other objects. The system is based on a matrix of blocks on which pallets move, carrying cargos or travelling empty.

The pallets deposit cargo for storage, or retrieve them for removal from the system, or travel empty on their way to perform one of these operations. The matrix-based layout of the system is one of its distinguishing characteristics. The entirety or nearly the entirety of the area of the system is occupied by blocks. Pallets may be transported (by motoring means which are either integral to the pallets or integral to the blocks) from a given block to any unoccupied neighboring block, in either of two orthogonal directions which are referred to hereinafter as forward-backward and left-right.

Special 'buffers' or transport routes are kept reserved for transport of empty or loaded pallets to or from the storage area, which may be located e.g. on a different floor of the building. These buffers are similar to the driving path within a conventional parking garage insofar as they provide transport routes for cargo on their way to or from storage. Unlike a conventional parking garage however the buffers are strictly divided into modular units, each capable of certain unit operations such as transporting a pallet in one of four perpendicular directions or allowing such transport, and arranged in a grid of mathematical precision.

As described above, the present invention relates to the service level or in other words to the level of reception and extraction of cargo.

One of the major advantages of the system is the possibility to organize different procedures for receiving, extracting or replacing (i.e., tradeoff mode) of cargo.

Said receiving, extracting or replacing cargo is performed in a sequence characterized by high efficiency and quickly.

Furthermore, the present invention enables almost full operation of the system even if there is technical failure (or any other failure) in one of the system's components.

In other words, malfunction of one component does not result in the annulment of the entire system.

A pallet, in accordance with some embodiments of the invention, is used either independently or in cooperation with other components of the system for holding, transferring, storing, receiving and releasing cargo. The pallet may include an integrated mechanical, electromechanical or robotic transport mechanism (see FIGS. 3A, 3E, FIG. 1I), or such mechanism(s) may be associated with the pallet but not an integral part thereof—(see FIGS. 3B, 3F, 3J). The cargo may be boxes, merchandise, vehicle et cetera.

The transport mechanism allows the pallet to move in two perpendicular directions. The ability to move in two perpendicular directions enables each pallet to move from one block to another within a service level, and each pallet can thus move to any block, to the elevator and to the boxes.

The service level includes at least four blocks arranged at minimum as a 2×2 (length×width) matrix including box, elevator and buffers. The system includes:

a. At least one elevator that is adapted for transporting a pallet from said service level to at least one storage level;

b. At least one insertion/extraction box (hereinafter: "box") that is positioned such that at least one outer edge thereof is located at an outer wall of said facility. The box comprises at least two adjacent blocks; and, c. At least two buffers, each buffer being capable of allowing transporting of cargo (upon pallets) or empty pallet from one block to another at least over two orthogonal axis.

According to some embodiments of the invention, the service level includes at least one box. The box is an area on the service level that allows the conditions for the loading or unloading of a pallet. For example when a user of the system wants to park his/her car, he drives onto a pallet located in the box, and exits the car. Then the pallet transports the car to its storage location.

According to some embodiments of the invention, the blocks forming a box are arranged such that one of the long sides of each of the blocks within the box is adjacent to the long sides of the other blocks that are part of the box (assuming each block is rectangular).

With the help of the blocks, the box allows transporting the pallets to any one of at least two blocks that are adjacent to the box (see FIG. 7).

According to some embodiments of the invention, the system may include at least one elevator block to enable access from and to the service level to an elevator.

A block called "elevator" (hereinafter: "elevator") is the location that is reserved for the elevator, or any other kind of a mechanism that connects two different levels (e.g., storage levels with a service level) or at least two areas in different level.

According to some embodiments of the invention, under certain circumstances as described for example below, the elevator is referred to as a block, and like any other block, allows transportation at least in two perpendicular (orthogonal) directions within a service level (see FIG. 8).

According to some embodiments of the invention, the system may include at least two buffer blocks (hereinafter: "buffer 1", "buffer 2"). One of which is used for the transportation of empty pallets and the other is used for the transportation of loaded pallets.

The buffers allow, like any other block, transportation at least in any one of two perpendicular directions within service level (see FIG. 9).

According to some embodiments of the invention, under certain circumstances the buffer blocks may be used to provide temporary, short-term storage for a pallet (or pallets) which are in transit from a box to an elevator or vice-versa. As will be described in further detail below, while the buffer blocks are used in this manner, it may be possible to lower the dependence and need for synchronization between the box and the elevator and thereby improve the efficiency and possibly also the simplicity of the system.

According to further embodiments of the invention, under other circumstances, the buffer blocks may be converted into storage blocks, as will be described in greater detail below. Some embodiments of the invention, relate to a system and logic for controlling various aspect of the operation of a service level and storage levels, that allow, while the storage levels are in service time mode, to operate in a service level reception mode that allows the reception of a large flow of cargo in a short period of time, in both service level boxes (assuming that there are two boxes, although according to some embodiments there may be any number of boxes at a service level starting from one and above), while using "buffer 1" and "buffer 2".

The purpose of the reception mode is to receive stocks of cargo one after another (in a batch like manner) to a box and from the box through an elevator to the storage level. There is an option to transfer received cargo to the storage level from a box to an elevator through at least one buffer, and to transfer empty pallets back from the same elevator to the same box through at least one buffer but via a different route. These two routes are substantially without any common buffers. Said different route enables simultaneously and efficient loading and unloading of cargo.

Figure 16:
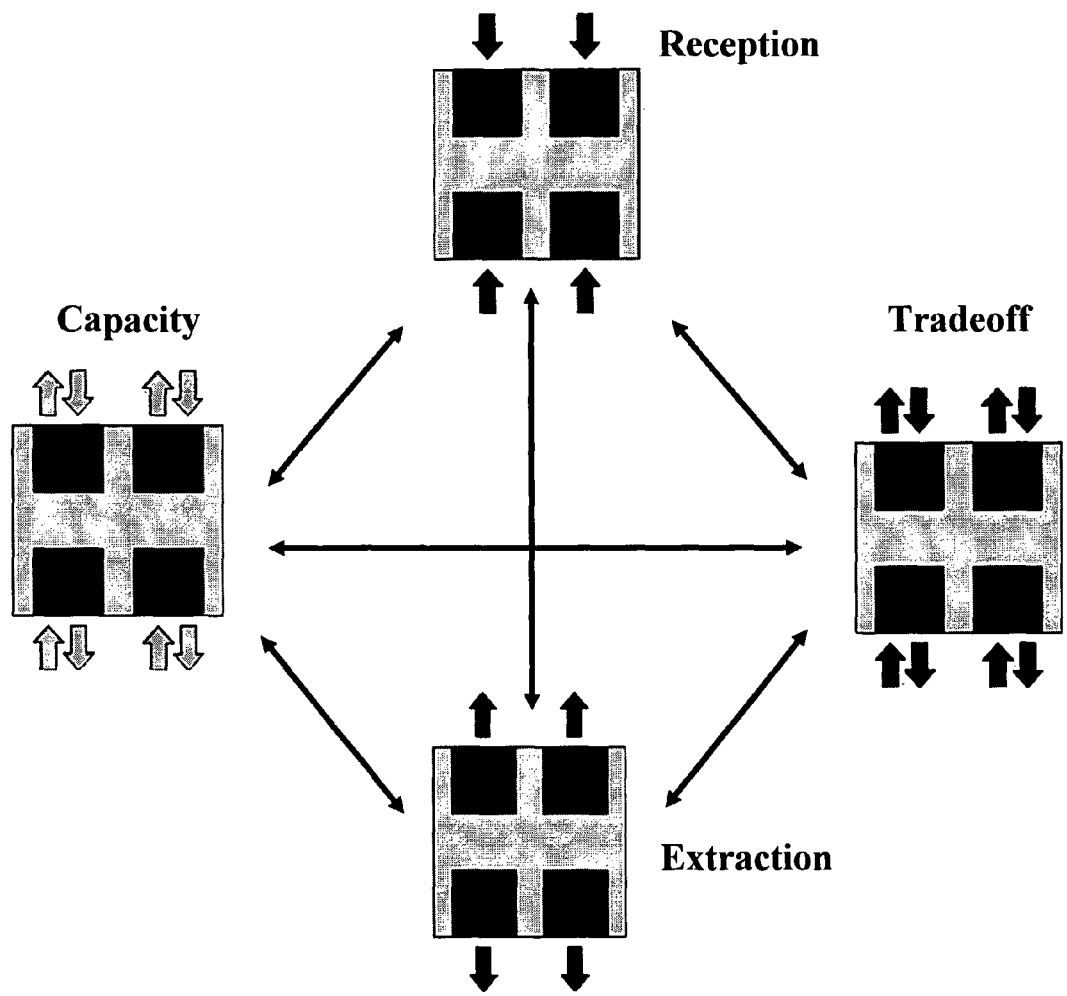
FIG. 16 is a graphical illustration of the directions in which the system and logic can switch between the modes, while taking into account the state of the system (storage levels and service level) and queues for receiving/releasing vehicles.

Reception mode allows the reception of a large flow of cargo in a short period of time, for example, for market segments A and B (see FIG. 16).

Some embodiments of the invention, relate to a system and logic for controlling various aspects of the operation of a service level and storage levels, that allow, while the storage levels are in service time mode, to operate the service level at an extraction mode that allows the release of a large flow of cargo in a short period of time, from both service level boxes while using "buffer 1" and "buffer 2" while considering the random extraction requests. Further details on the reception and extraction mode will be provided hereinafter.

According to some embodiments of the invention, the pallet may be in any one of at least two states:
(a) Empty—the pallet does not hold a cargo (see FIGS. 3A, B, C and D));
(b) Loaded—the pallet holds a cargo (see FIGS. 3(E, F, G, and H)) or cargo (FIGS. 3(I, J, K and L)).

According to some embodiments of the invention, the system includes a service level dedicated to logistical operations including entry and exit of cargo, transport of cargo on their way to or from storage. One or more storage levels will generally be provided in conjunction with the service level to allow the storage of cargo.

Figure 1B:
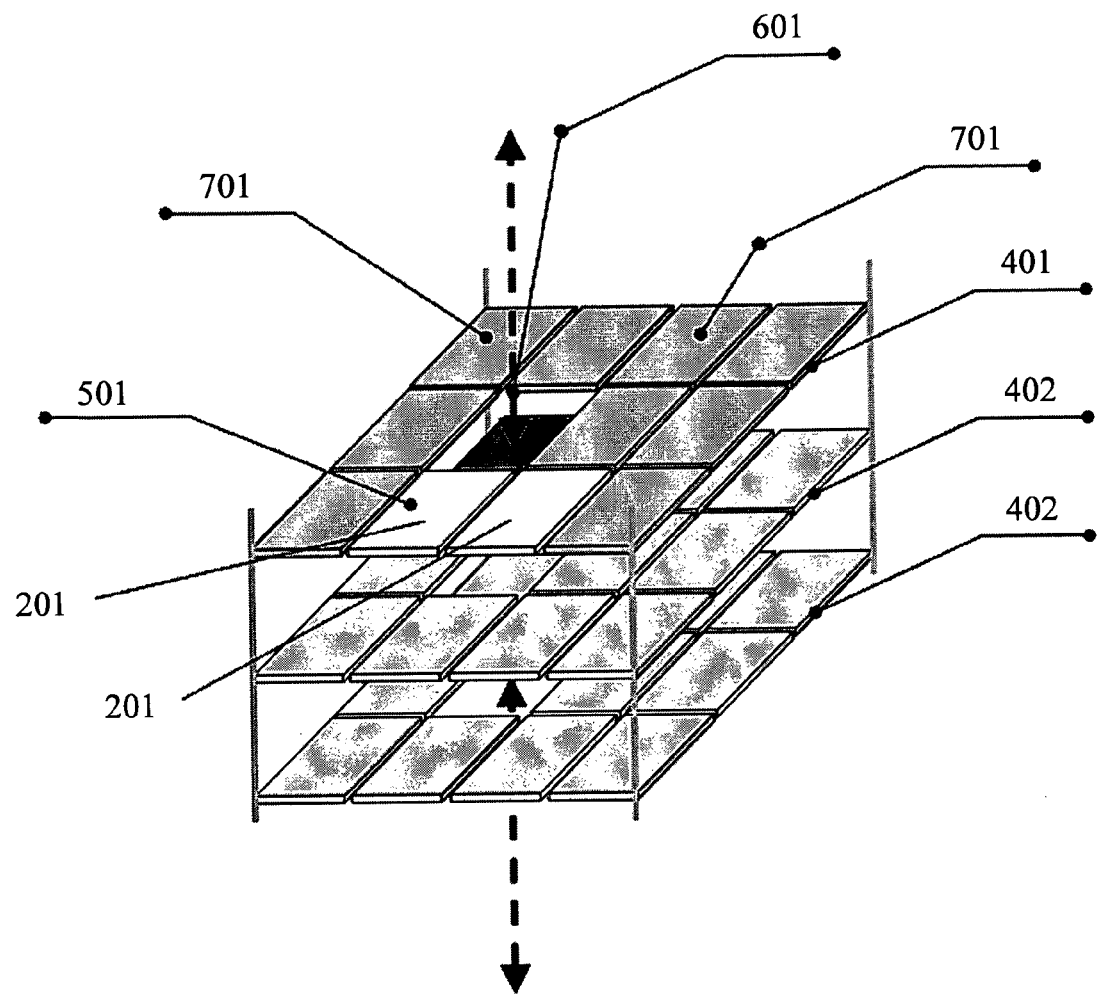

Reference is now made to FIGS. 1A-1B, presenting an illustration of a service level 401 and storage levels 402.

Figure 9A:
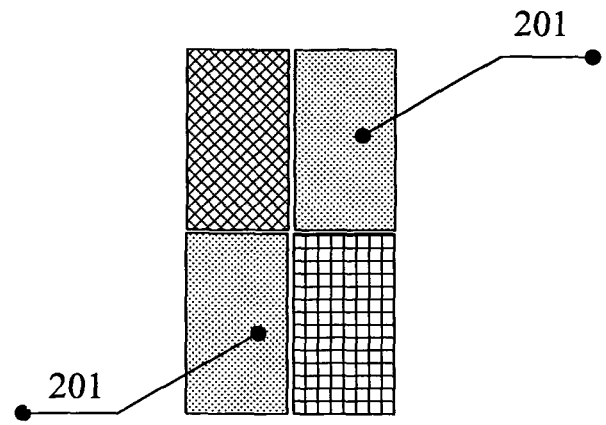
FIGS. 9(A)-9(D) is a graphical illustration of different embodiments of the service level and the different path exists therein.
Figure 9B:
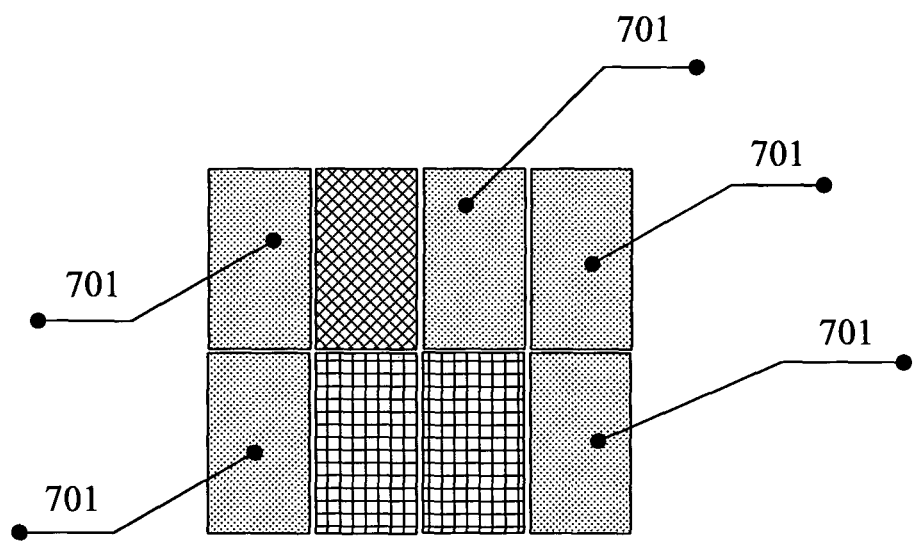
Figure 9C:
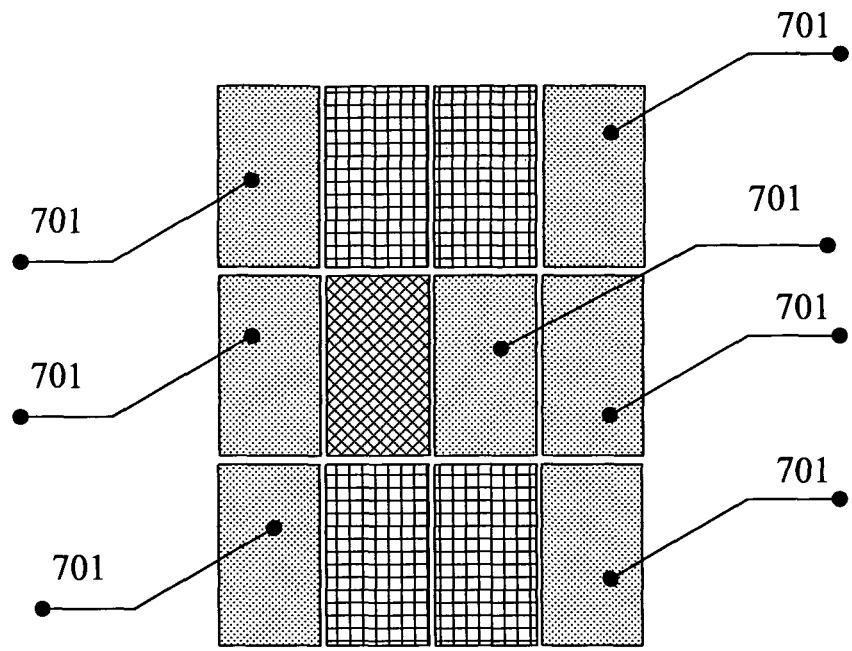
Figure 9D:
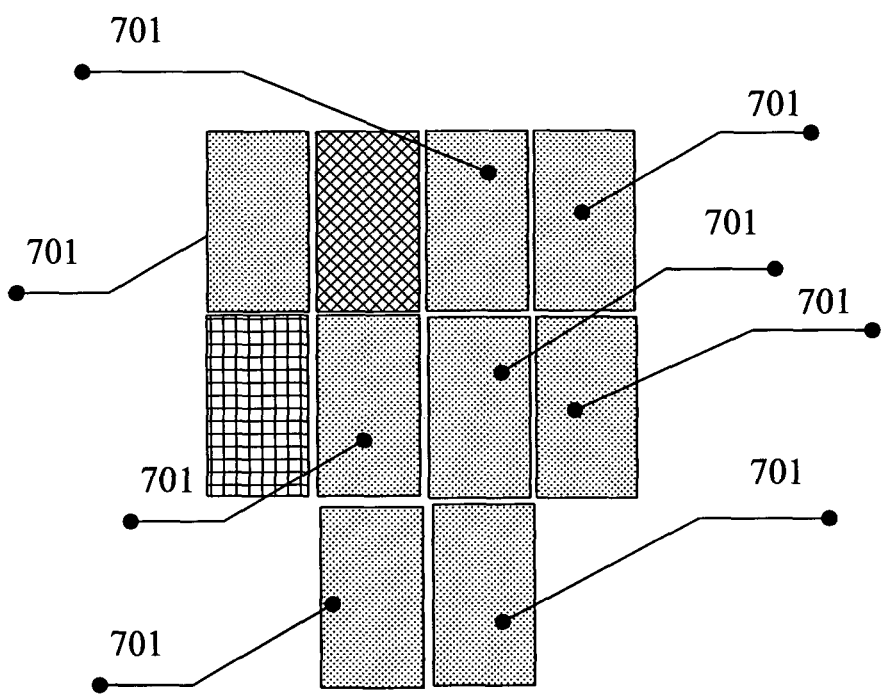

It should be emphasized that all figures are given as an example and the service level might be in any size (i.e., any matrix having regular dimensions of [ixj] or any irregular dimensions as illustrated in FIG. 9D) and shape.

Buffers 701, boxes 501 and elevators 601 are marked on the illustration in the service level. The elevator 601 connects the different levels of the storage/parking facility. In FIGS. 1A-1B the elevator 601 moves vertically from one level to the other, however it should be pointed out that it can also move horizontally from one area of a level to the other.

In this example, the 'boxes' are sets of two adjacent blocks (denotes as numerical references 201). Two blocks are grouped into a box as a functional unit. for example, since two adjacent blocks allow a vehicle occupant to exit the vehicle, unload it, etc. if one block is the expected average width of a vehicle.

FIGS. 1A-1B illustrates different embodiment of the system. In FIG. 1A there are 2 boxes and in FIG. 1B there is one box.

Figure 2A:
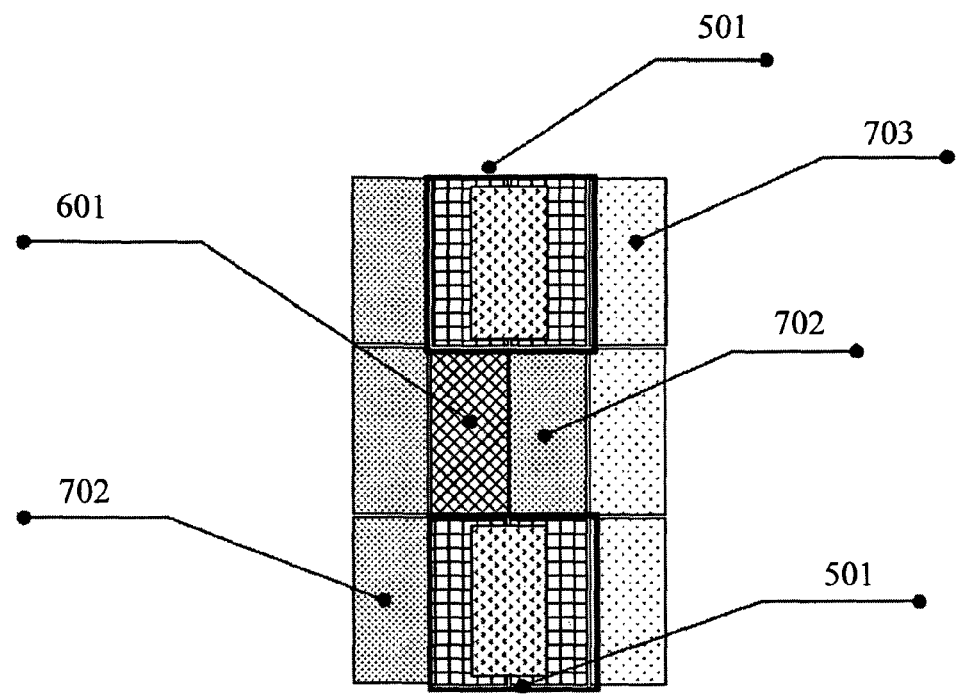
FIGS. 2A-B are graphical illustrations of a service level ("Level X") according to some embodiments of the invention, with indications of boxes, elevators and buffers ("buffer 1", "buffer 2") areas.
Figure 2B:
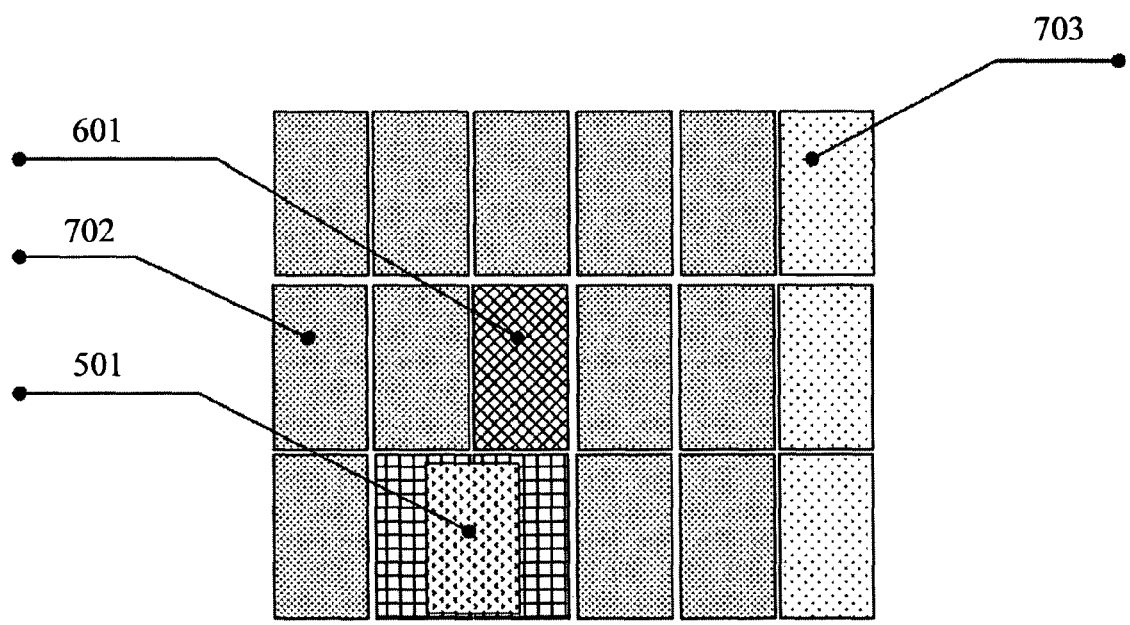

Reference is now made to FIGS. 2A-2B illustrating a service level showing boxes 501, elevators 601 and buffers ("buffer 1" 702, "buffer 2" 703) areas.

"Buffer 1" 702 is used for pallets with cargo. Here the surroundings of "buffer 2" 703 are designed so that "buffer 2" 703 is used as a buffer for empty pallets only. Movement of loaded pallets, with cargo on them, usually does not occur on the blocks of buffer 2 (it might happen in special circumstances as will be described hereinafter).

"Buffer 1", 702, thus constitutes a route for loaded pallets to reach the storage level(s), while "Buffer 2" constitutes a route for transporting empty pallets back from the storage level, and the boxes 501 serve as loading/unloading stations.

The system preferably uses a plurality of boxes, which are located in the area around the elevator on the service level for purposes of loading and unloading cargo from outside the system. For example there are two boxes 501, employed in FIG. 2A, and one box 501, employed in FIG. 2B. An advantage of using more than one box is that usage of elevators is made more efficient. Elevators are typically characterized by a work-cycle that is faster than the time that is typically necessary for a storage cycle (namely the time required to transport cargo on a pallet from the elevator to its storage location, unload the cargo from the pallet the storage location, and return the pallet to the elevator).

According to further embodiments of the invention, multiple boxes provide redundancy and thus increase reliability, improving the system's ability to handle failures. For example, the two-box configuration may enable continued operation of the system even if one box is disabled. As an example, while one of the boxes is down, all the cargo may be released through the other box (or boxes if more than two).

This solution is provided by way of example only and should not be construed to limit the scope of the present invention.

Reference is now made to FIG. 3(A), a graphical illustration of a pallet 801 without transport mechanisms. In this case the floor of each block 201 has a transporting mechanism. FIG. 3(B) is a graphical illustration of a pallet with an automatic transport mechanism while the floor is without mechanisms.

FIG. 3(C) is a graphical illustration of a pallet with an automatic transport mechanism whilst the floor (e.g., block 201) also carries a transport mechanism. These mechanisms work in synergy with each other. FIG. 3(D) is a graphical illustration of a pallet without autonomic transport mechanism and the floor is without transport mechanism. A separate transport mechanism that arrives on the location when necessary is provided in this case. This mechanism is used for transporting the pallet from block to block. FIGS. 3(E), 3(F), 3(G), 3(H) are graphical illustrations of different pallets (see above) holding cargo. FIGS. 3(I), 3(J), 3(K), 3(L) are graphical illustrations of different pallets (see above) holding boxes and cargo.

Reference is now made to FIGS. 4(A) and 4(B), graphical illustrations of two different possible embodiments of the structure of a block 201.

In 4(A) the block includes a transportation mechanism and in 4(B) the block constitutes a floor without mechanisms.

FIG. 4(C) is a graphical illustration of the transportation of a pallet without mechanisms between blocks that have transportation mechanisms.

FIG. 4(D) is a graphical illustration of the transportation of a pallet with transportation mechanisms between blocks without transportation mechanisms.

Figure 5A:
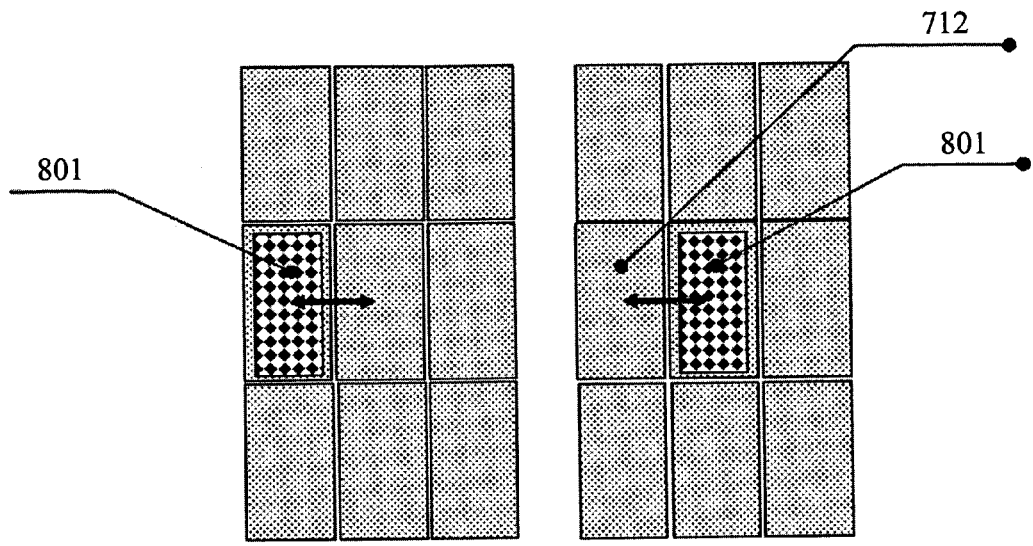
FIGS. 5(A) and 5(B) are graphical illustration of a manner by which a pallet may transported in perpendicular directions.
Figure 5B:
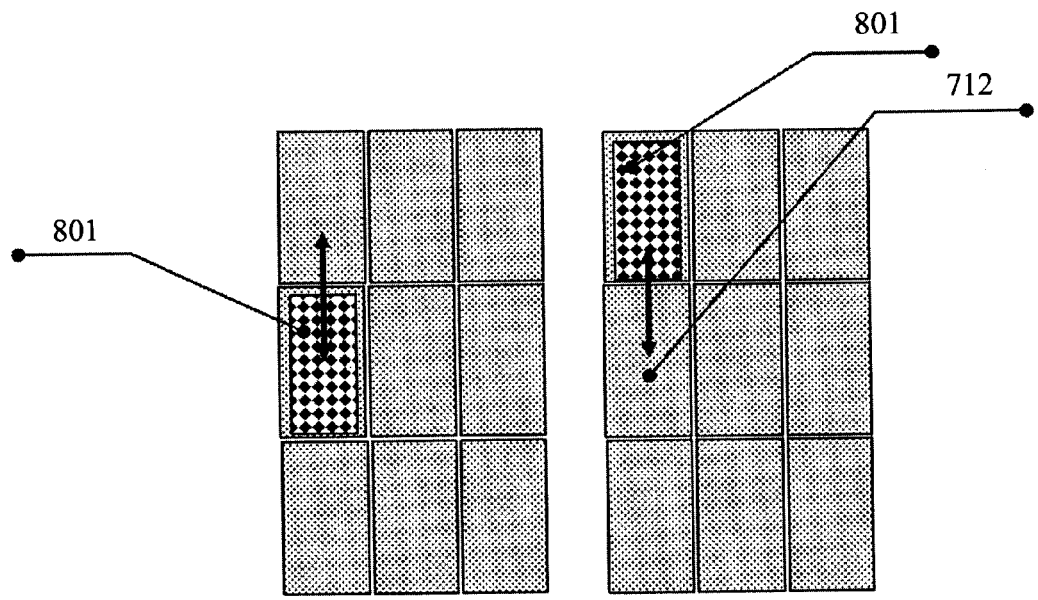

Reference is now made to FIGS. 5(A) and 5(B), a graphical illustration of one manner by which a pallet 801 may transported from one position to another position in two different perpendicular directions.

Figure 6A:
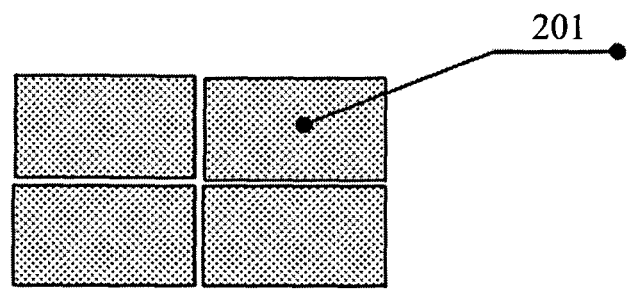
FIGS. 6(A) and 6(B) are graphical illustrations of the minimal area of a service level built out of blocks.

Reference is now made to FIG. 6A, a graphical illustration of the minimal area of a service level built of blocks 201. The minimal area comprises a length of two blocks 201; and the width is two blocks.

Figure 6B:
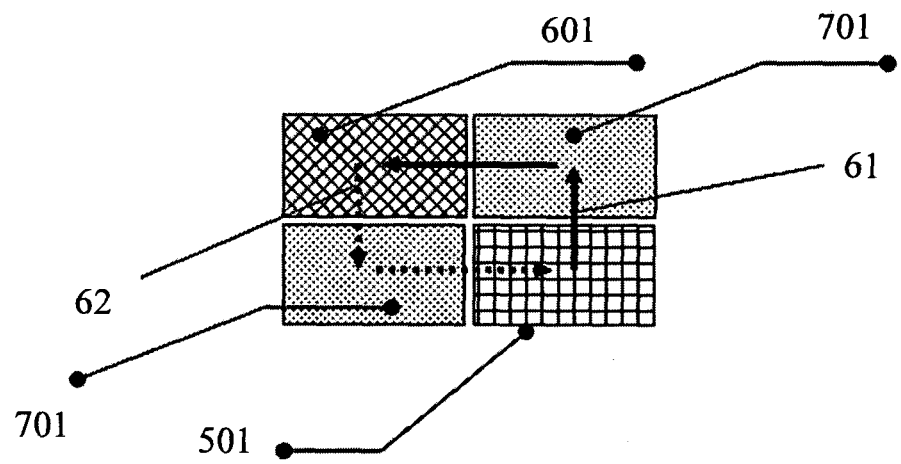
Figure 7A:
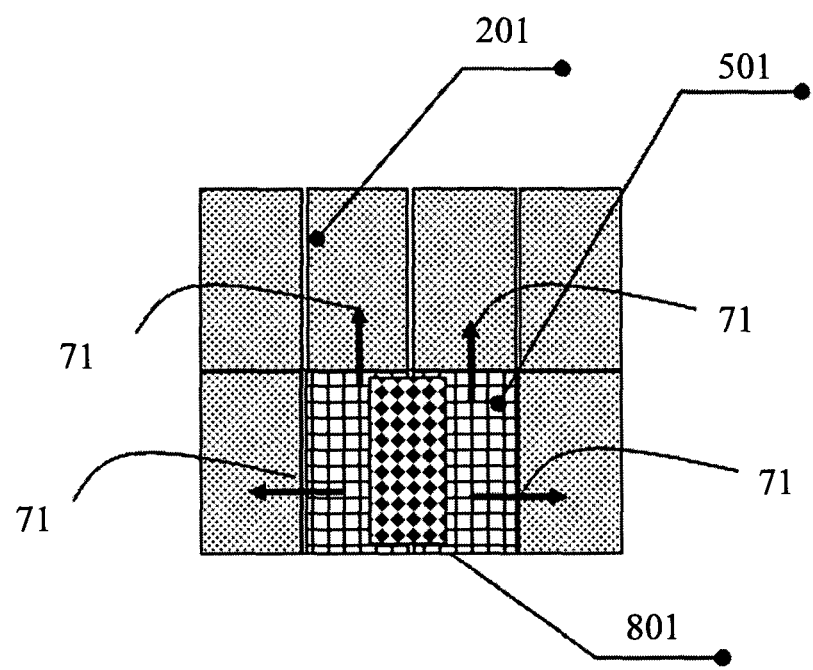
FIGS. 7(A)-7(C) is a graphical illustration of the transmission between the box and the adjacent blocks. The arrows show the directions of the transmission.
Figure 7B:
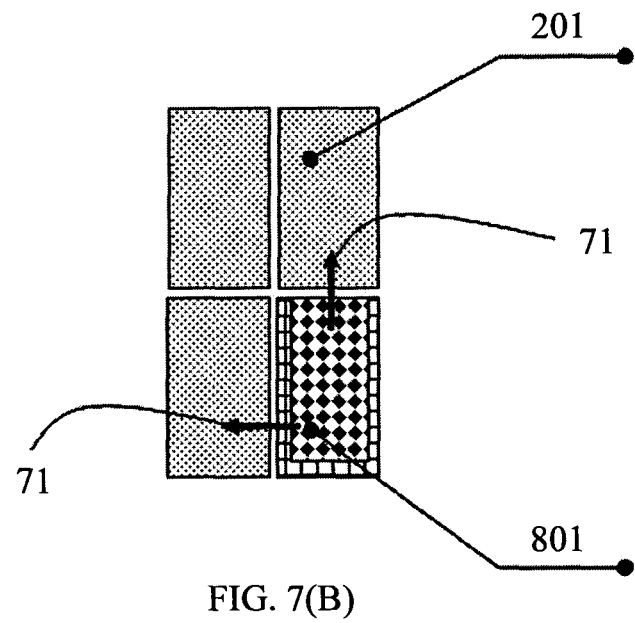
Figure 7C:
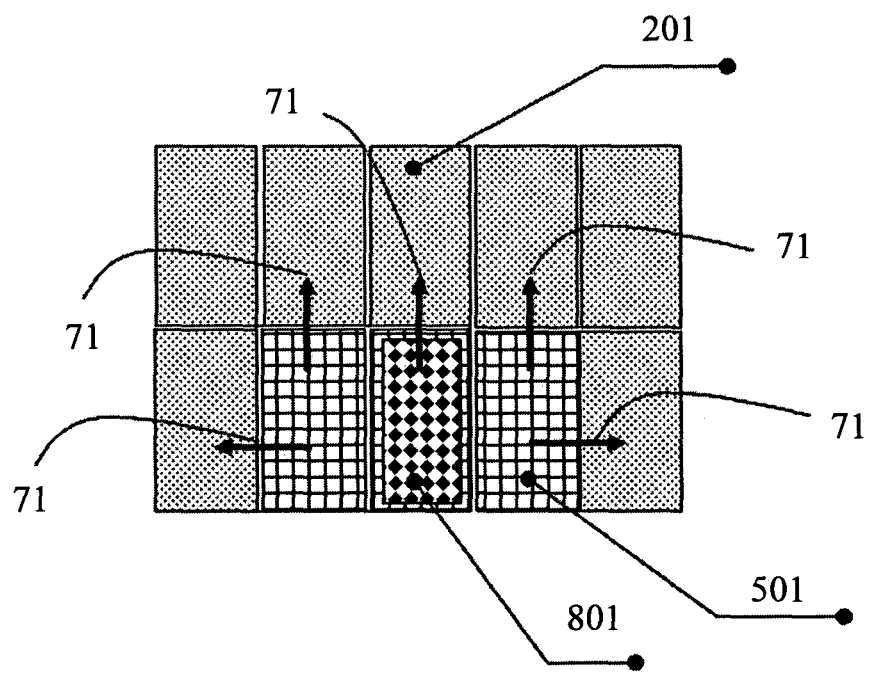

Reference is now made to FIG. 6B, a graphical illustration of the two different path for transporting cargo from and to the service area. In the first path, cargo is transported from the storage level (via the elevator 601) to the box 501 in the service area via the buffer 701. The first path is denoted with the dotted arrows 62. In the second path, cargo is transported from the box 501 in the service area via the buffer 701 to the storage level via the elevator 601. The second path is denoted with the solid arrows 61. As can be seen from both figures each cargo can be transported in two orthogonal directions. Furthermore, it should be emphasized that the storage path and the removal path are completely independent with no overlap thus, allowing simultaneous operation. Reference is now made to FIGS. 7(A)-7(C), in which a graphical illustration of the transmission between the box 501 and the adjacent block 201 (which may be a buffer 701 or elevator 601) is provided. The arrows (denotes as numerical reference 71) show the directions of the transmission of pallet 801, which in FIG. 7A occupies the center of box 501, straddling the two blocks that comprise the box. Box 501 consists of two adjacent blocks. It should be appreciated, that in all cases, one side of the box 501 is adjacent to the outer border of the service level. FIG. 7(A) illustrates an embodiment in which the service level comprises a matrix of 4×2 blocks; FIG. 7(B) illustrates an embodiment in which the service level comprises a matrix of 2×2 blocks; and, FIG. 7(C) illustrates an embodiment in which the service level comprises a matrix of 5×2 blocks.

It should be noted that in FIG. 7C the box comprises 3 blocks.

Figure 8A:
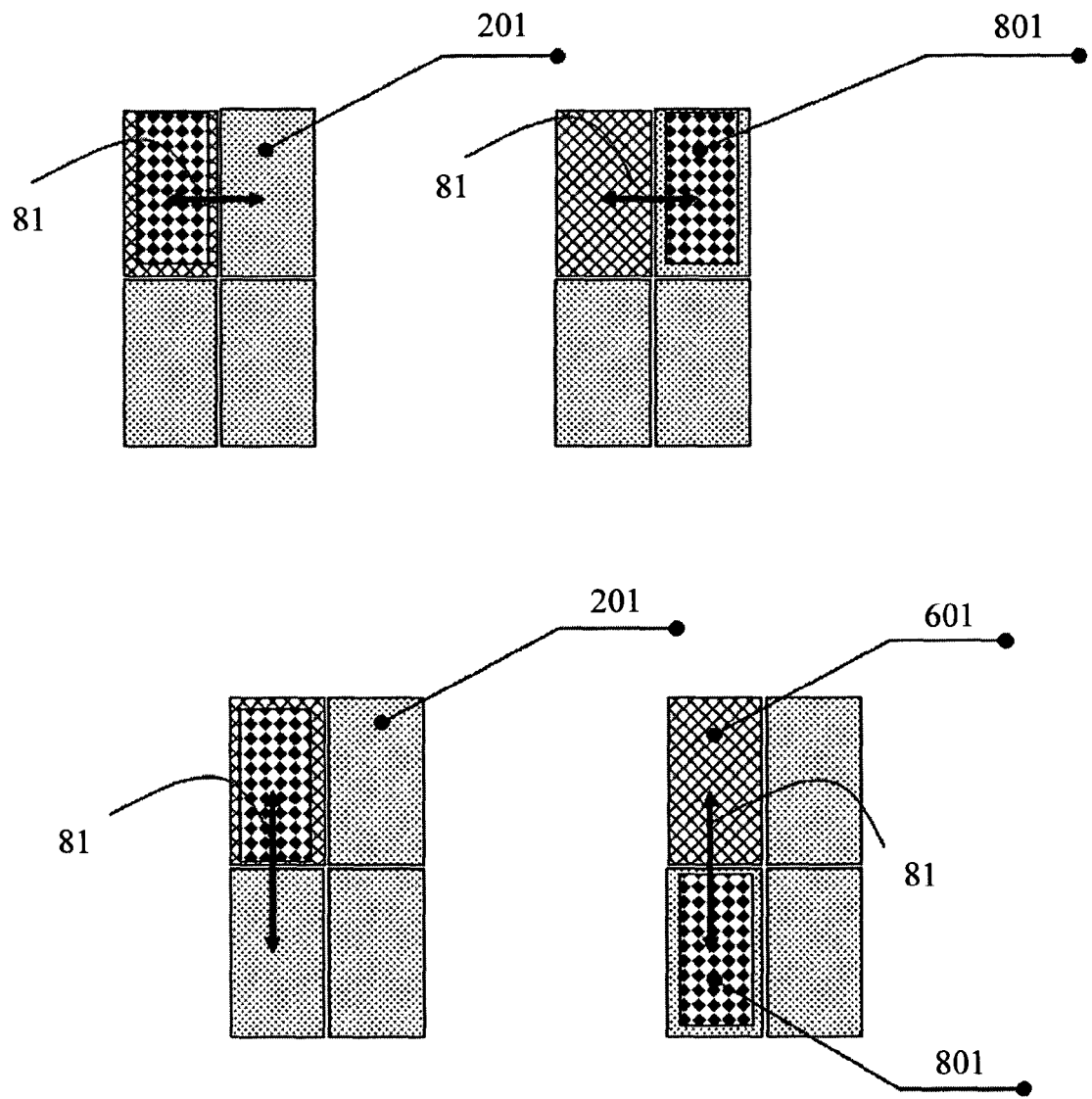
FIGS. 8(A)-8(C) is a graphical illustration of the transmission between the elevator and the adjacent blocks. The arrows show the directions of the transmission.
Figure 8B:
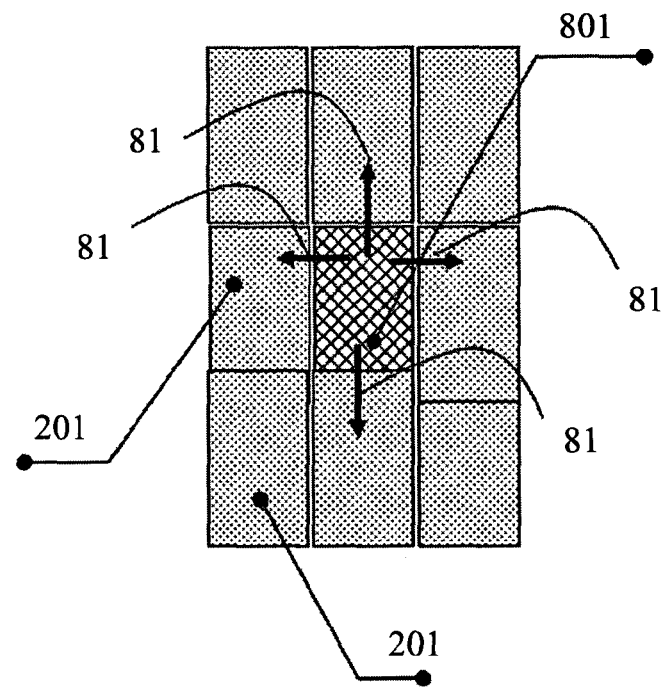
Figure 8C:
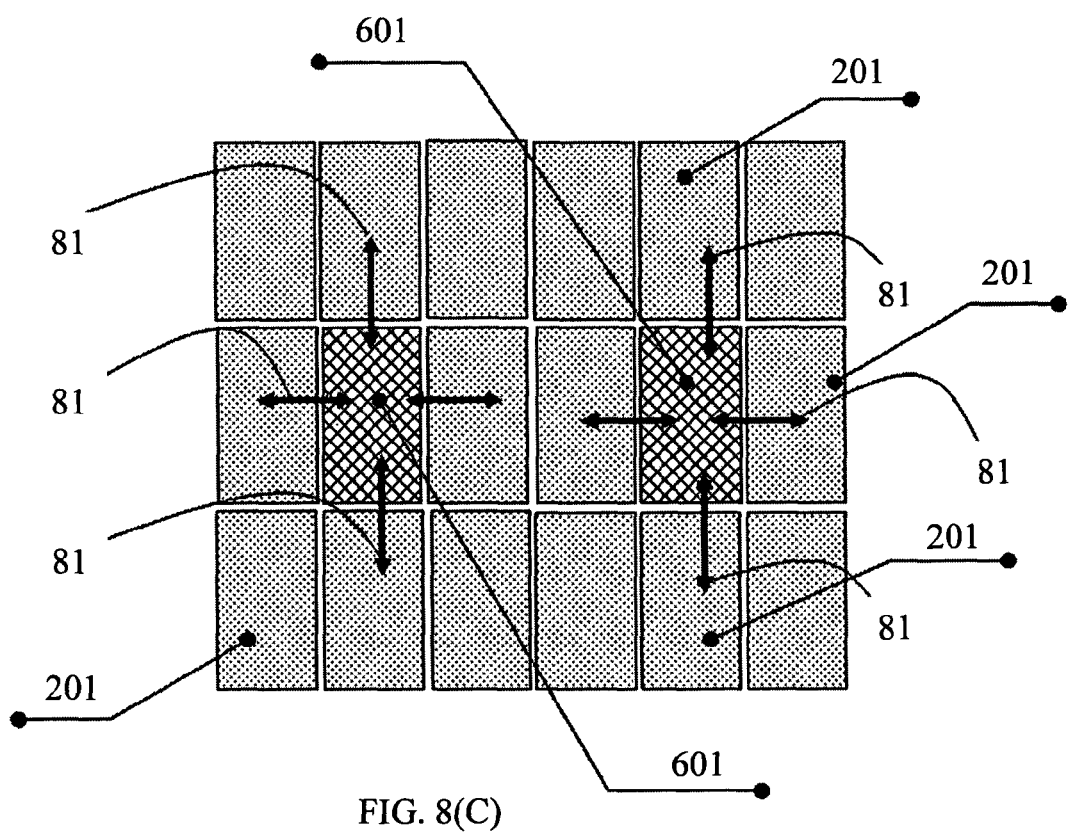

Reference is now made to FIGS. 8A-8C, an illustration of pallet transport between the elevator 601 and the adjacent block 201 (which may be buffer or box). The arrows (denotes as numerical reference 81) show the directions of the movement of pallet 801. It should be emphasized that according to a preferred embodiment of the present invention the elevator 601 enables the movement of pallets in two orthogonal directions.

FIG. 8(A) illustrates an embodiment in which the service level comprises a matrix of 2×2 blocks; FIG. 8(B) illustrates an embodiment in which the service level comprises a matrix of 3×3 blocks; and, FIG. 8(C) illustrates an embodiment in which the service level comprises a matrix of 6×3 blocks.

Furthermore FIG. 8C illustrates and embodiment in which two elevators exists.

Reference is now made to FIGS. 9A-9D, an illustration of the buffers 701 scattered in a service level. FIG. 9A illustrates the minimum configuration of the system which comprises 2 block 201, one elevator 601 and one box 501.

FIG. 9B illustrates a system which comprises a configuration in which there are 4×2 blocks.

FIG. 9B also illustrates the two different paths for storage and retrieval of cargo. The first path (denoted by the solid arrows) is a storage path in which cargo is received from outside the system into box 501 and then to the elevator 601 through buffers 701.

The second path (denoted by the dotted arrows) is a retrieval path in which cargo is extracted outside the system (i.e., from the storage level via the elevator 601 to the service level, from there to box 501 through buffers 701).

Figure 10A:
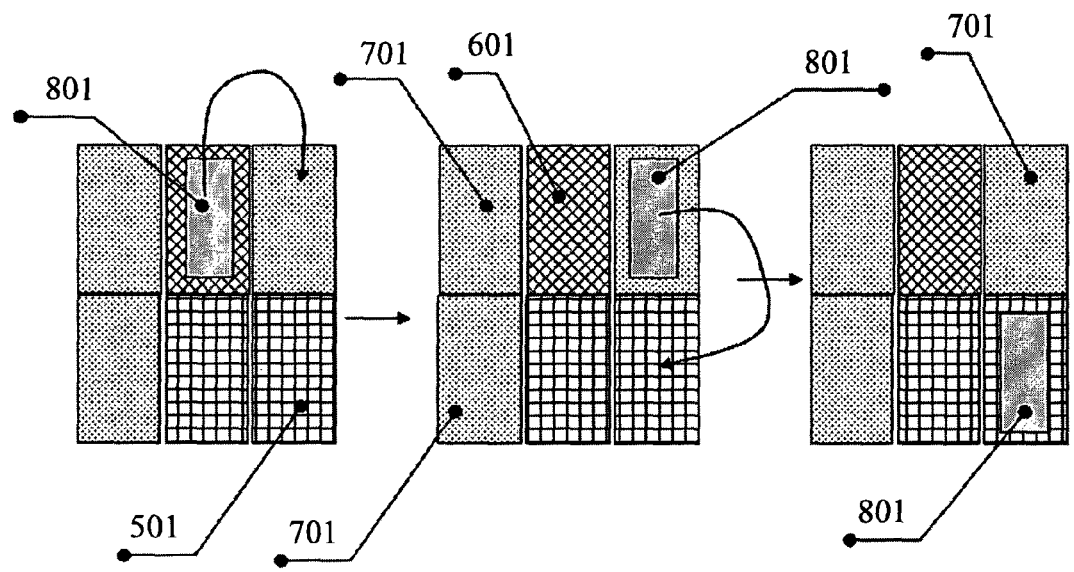
FIGS. 10(A)-10(B) is a graphical illustration of the transmission between a block and the adjacent blocks (including buffer blocks, elevator and boxes).
Figure 10B:
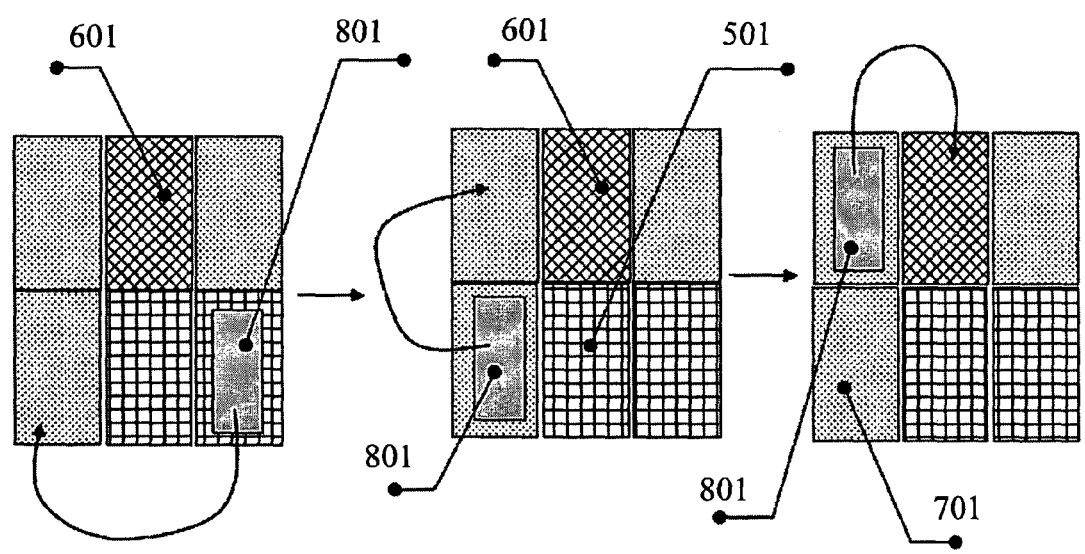

FIG. 9C illustrates an embodiment in which two boxes are utilized. Usage of two boxes increases the efficiency of the system and converts the system to be redundant such that the operation of the system is not neutralized by malfunction of one box. Reference is now made to FIGS. 10A-10B, an illustration of the transmission of pallet 801 between a block and the adjacent blocks (including buffers 701, elevator 601 and boxes 501). The arrows show the directions of the transmission.

It should be emphasized that one buffer can be part of multiple routes. The multiple routes must be of the same mode (e.g., removal route or storage route).

Figure 11A:
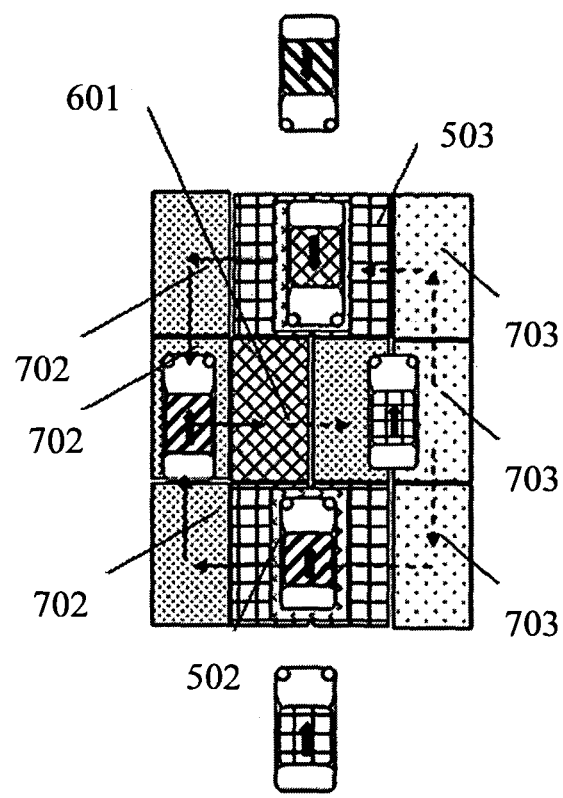
FIGS. 11(A)-11(B) is a graphical illustration of a service level in reception mode, which shows the order of pallet transportation, with vehicles on them, towards the elevator, through the buffers ("buffer 1") while afterwards the elevator transfers them to the storage levels.
Figure 11B:
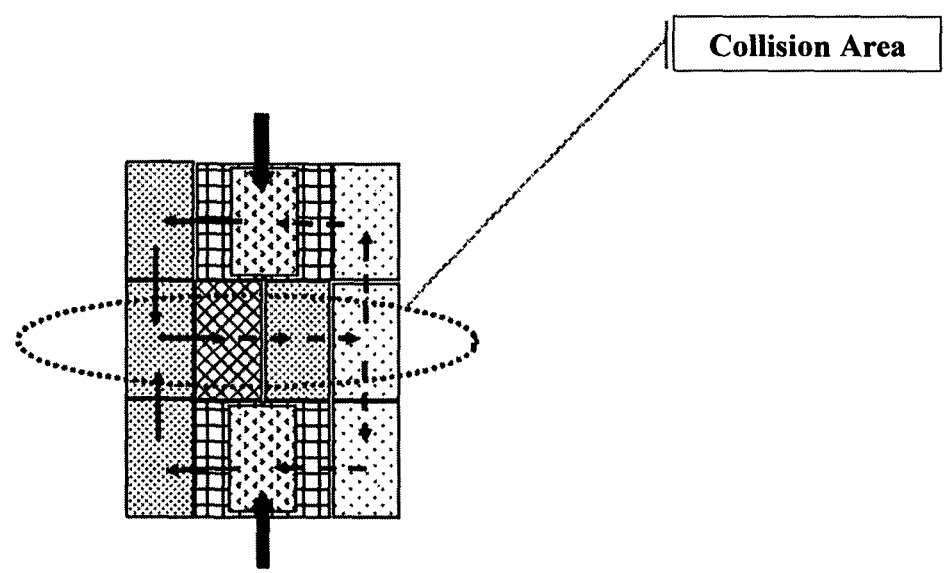

Reference is now made to FIGS. 11A-11B, illustrating a service level in reception mode, which shows the order of transportation of pallets with cargo on them (see regular arrows), towards the elevator 601, through the buffers ("buffer 1" 702) while afterwards the elevator transfers them to the storage levels. The same illustrations show transportation of empty pallets (see broken-line arrows), that arrive via the elevator 601 from storage to service level, instead of the full pallets. The empty pallet route goes from the elevator through "buffer 1" 712 or "buffers 2" 703 towards the boxes 502, 503.

Figure 12A:
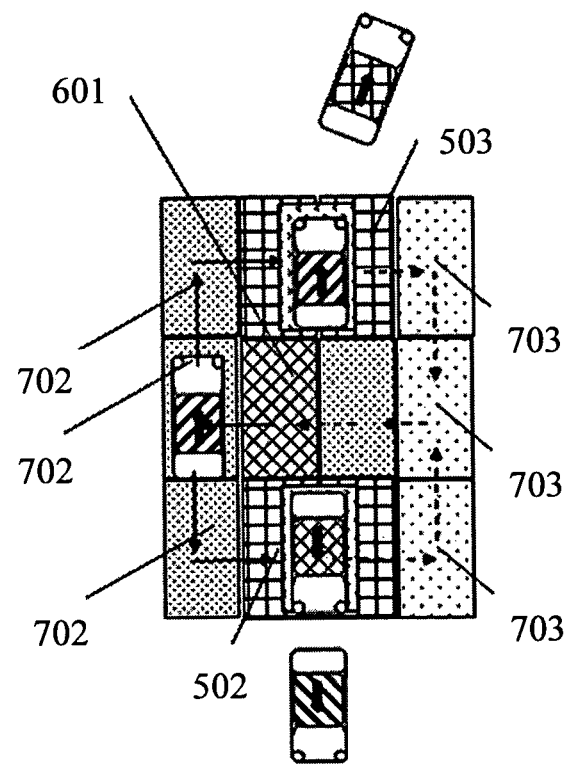
FIGS. 12(A)-12(B) is a graphical illustration of a service level in extraction mode which shows the order of pallet transportation, with vehicles on them, that are transferred from the storage levels to the service level in order to be released to the costumers.
Figure 12B:
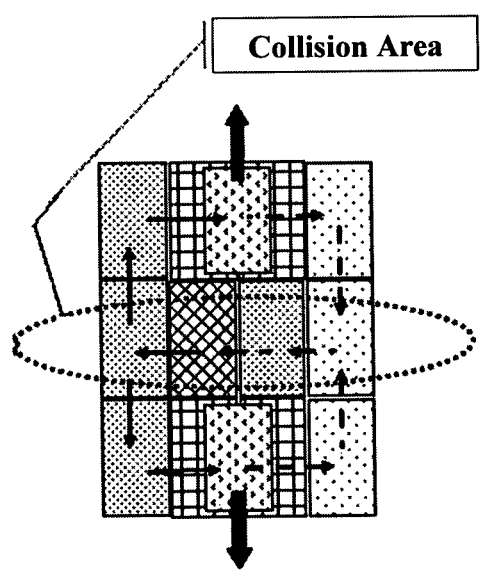

As is shown in FIG. 11, and according to some embodiments of the invention, a service level may include two boxes, and the transmission circulation routes may overlap at a "Collision Area" (see FIG. 12(B)).

According to some embodiments of the invention, within the Collision Area each one of the two circulation routes may be managed so that they proceed in different operational modes. While one of the boxes begins to receive new cargo, the other is in the middle of another action such as cargo transfer, which gives the opportunity for pallets carrying cargo to reach the elevator undisturbed or with less interruption from both boxes. It also gives an opportunity for the empty pallets that arrive at the service level from the same elevator to replace the full pallets, to reach the two boxes undisturbed or with less interruption.

One practical advantage of the system is that immediately or within a limited period of time after receiving the cargo at a box, it is transferred to the buffer to wait for the elevator, and simultaneously, another empty pallet enters the box. Within a substantially short time the box is ready to receive the next cargo, and this may occur repeatedly. This solution is provided by way of example only and should not be construed to limit the scope of the present invention.

FIG. 12 is a graphical illustration of a service level in extraction mode which shows the order of pallets' transportation, with cargo on them (see regular arrows), that are transferred from the storage levels to the service level in order to be released to the customers. The transportation goes from the elevator 601, through "buffer 1" 702 in the direction of the boxes 502, 503 and ends in the release of the cargo from the boxes 502, 503.

The same illustrations show empty pallet transportation that were released in the boxes 502, 503 (see broken-line arrows), which transfer from the boxes 502, 503 to the elevator 602 via "buffer 1" 712 (always) and "buffer 2" 703 (occasionally), and are afterwards transferred to the storage levels instead of the pallets holding cargo that arrive from there.

The full and empty pallets circulation routes overlap in a "Collision Area" (FIG. 13(B)), in this area the circulation goes on different phases.

The flexibility of the system allows that while one of the boxes begins to release cargo, the other may be in the middle of an action such as loading/unloading a pallet, which allows pallets carrying cargo to reach the elevator undisturbed from both boxes. It also allows empty pallets, that return to the storage level via the same elevator to replace the full pallets, to reach their destination undisturbed or with less disturbance.

The practical result of this is that immediately or within a short period of time after the release of cargo, the empty pallet leaves for the buffer, and substantially simultaneously, another pallet, carrying cargo designated for extraction, may enter the box. This may occur repeatedly.

Figure 13:
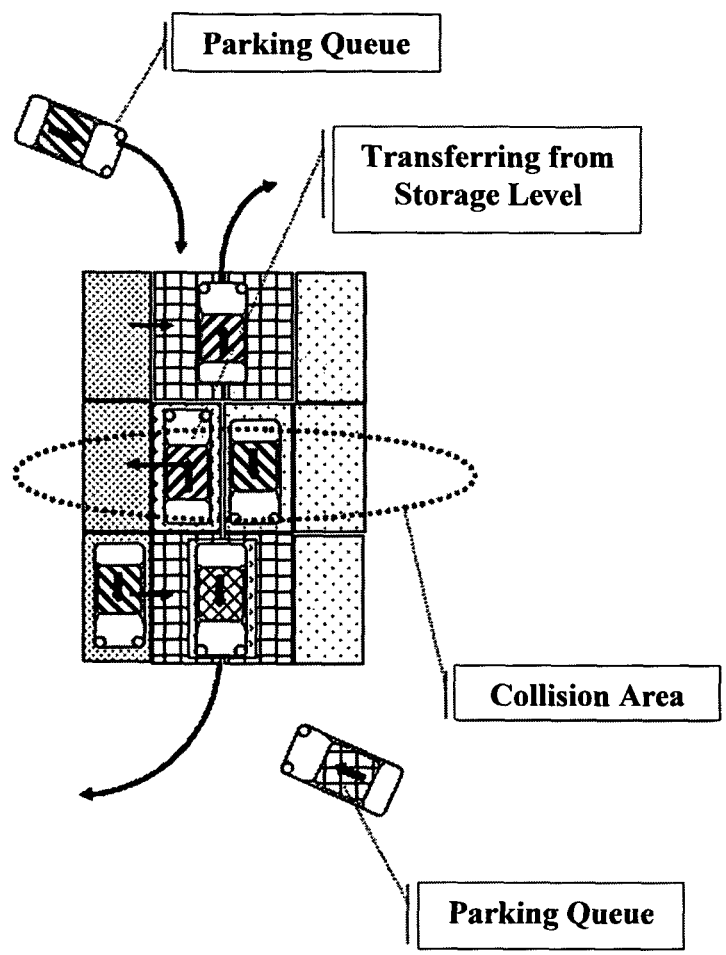
FIG. 13 is a graphical illustration of service level in a tradeoff mode which shows the order of vehicle release in accordance with a costumer's extraction request and an order for receiving vehicles into the facility for storage.

Reference is now made to FIG. 13, an illustration of a service level in a tradeoff mode which shows the order of cargo release in accordance with a customer's extraction request and an order for receiving cargo into the facility for storage.

As will be described in greater detail below, according to some embodiments of the invention, when an extraction request and a request to store cargo in the facility occur simultaneously, the system may be configured to tradeoff the requested cargo with one of the cargo requesting to enter the facility, such that the incoming cargo is placed on the same pallet that is used to transport the outgoing cargo out of the facility.

It would be appreciated, that in some cases that there isn't a cargo extraction request and there are empty pallets 802 . . . 809 on storage levels, an empty pallet will be called by the logical mechanism of the system, instead of calling cargo for release.

The operations illustrated in FIG. 13 are as follows:
(a) A pallet with cargo arrives via elevator from the storage levels to the service level.
(b) The pallet with cargo that arrived is transferred via "buffer 1" into the block adjacent to the elevator, and from there goes on into a block in "buffer 1" that is adjacent to a box, from there it is transferred into the box. It should also be pointed out that the current direction of the cargo is taken into account, so that it is extracted from the box with the front of the cargo being away from the facility.
(c) After the cargo is released from the box, the now empty pallet receives new cargo from the queue.
(d) The driver and passengers leave or enter through the box service area (here, the double, width of the box may provide an advantage—by providing additional space for convenient departure from the cargo, in case the system is indeed associated with a parking facility) leaving their cargo (e.g., car) or collecting it for extraction, and the pallet with the received cargo transfers from the box to "buffer 1" and from there to the elevator 601.
(e) The pallet with the received cargo transfers to the elevator and the elevator transports the pallet with the cargo to the storage levels for example, to the storage level from which the next released cargo will be taken.

In the storage level the pallet with the cargo that arrived for storage switches with the pallet with the cargo that was requested for extraction (see service time mode in PCT IL 2006\000589 "Automated Storage and Retrieval System").

The cycle is closed and the system returns to the starting point.

According to some embodiments of the invention, while the system is fully operating and there are no circumstances which require a special mode of operation (e.g., as may be implemented when there are two boxes and one has malfunctioned). A cargo, especially a vehicle, being extracted from the facility may be extracted such that the vehicle's front is pointing outwards, ready for the customer to leave the facility with ease.

According to some embodiments of the invention, in order to enable this forward facing capability of the system, for each item that is received into the facility, the direction at which the item is forward facing is recorded at the time the cargo is received into the system.

The circulation routes of the full pallets carrying received cargo on the one hand and cargo for release on the other hand overlap at a "Collision Area", in this area the circulation goes on different phases.

The meaning of the different phases is, that while one of the boxes begins to release a cargo, the other is in the middle of an action, and that gives the opportunity for pallets carrying cargo for release to reach from the elevator undisturbed or with less disturbance to both boxes, and gives the opportunity for the pallets carrying received cargo, to reach the elevator undisturbed or with less disturbance.

The practical result of this aspect of the system is that substantially immediately or within a relatively short period of time after the release of a cargo, a different cargo is received on the same pallet, and the pallet substantially immediately or within a short period of time afterwards goes to the buffer and from there to the elevator. Substantially simultaneously with the pallet's departure with the cargo, another pallet with a cargo designated for release may enter the box. This may occur repeatedly.

This solution is provided by way of example only and should not be construed to limit the scope of the present invention.

Figure 14A:
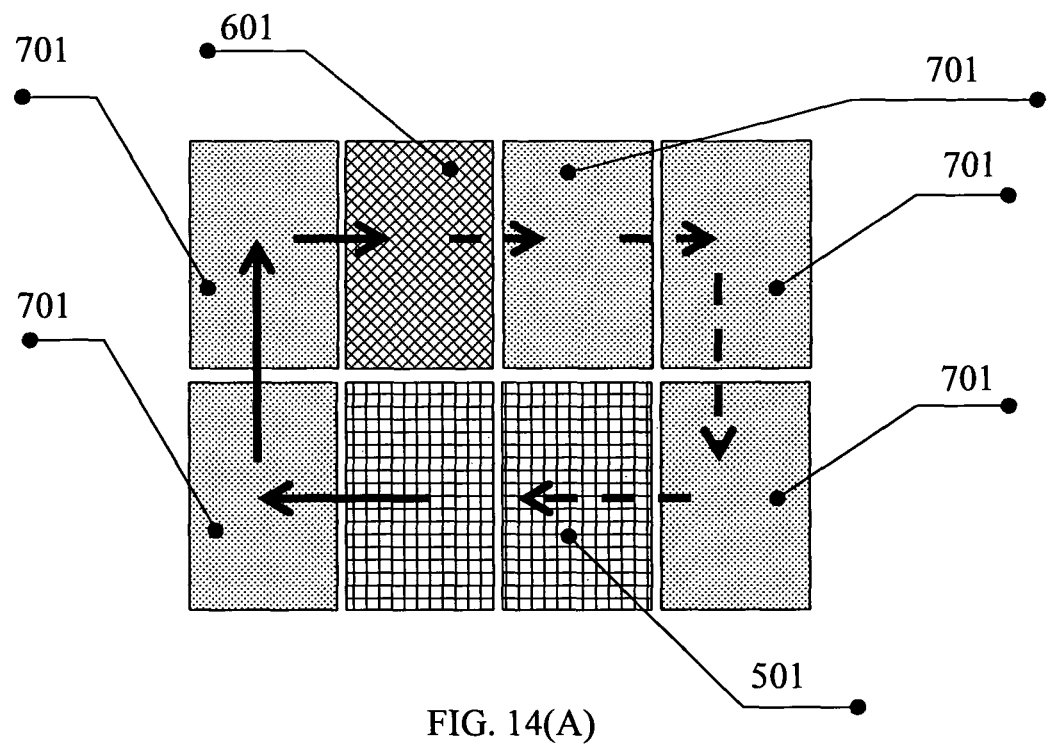
FIGS. 14(A)-14(D) illustrates the ability of the system to still operate even if there is malfunction in one of its elements.

FIG. 14(A) is a graphical illustration of the circulation path of an incoming cargo (solid arrows) from box 501 to the elevator 601 (and from there to the storage level). Said Figure also illustrate the removal path (dotted arrows) in which cargo is extracted from the storage level to the service level (via elevator 601) and from there to the box 501 via buffers 701.

Figure 14B:
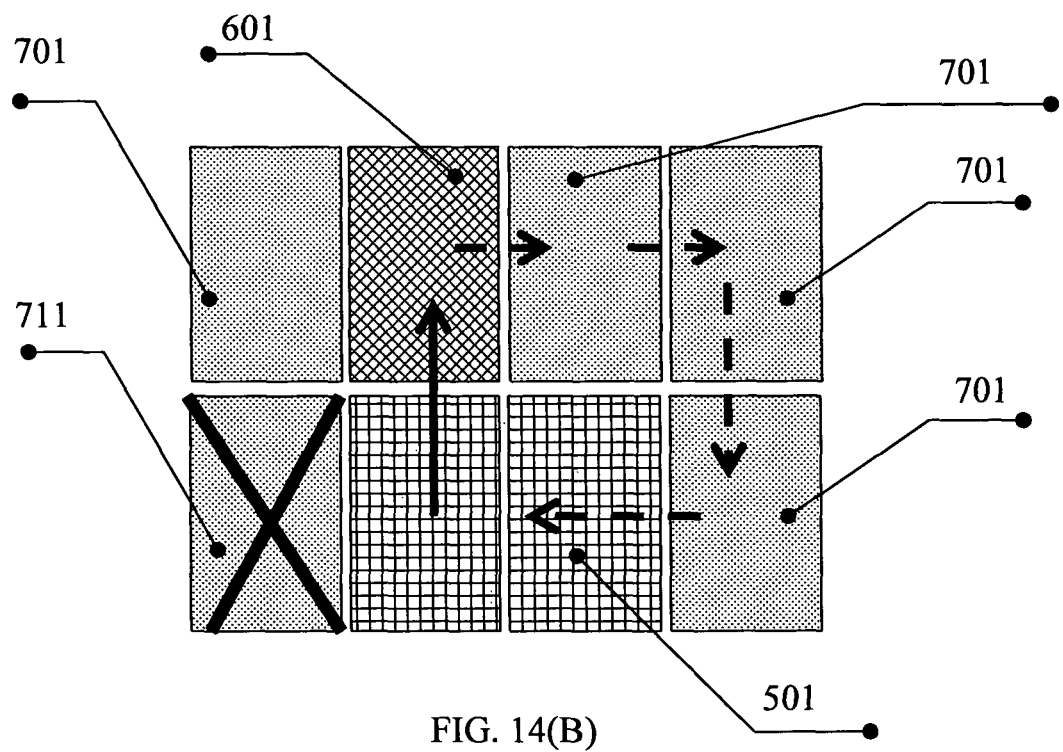

Reference is now made to FIG. 14B which illustrates a possibility of malfunctioning of one buffer 711. As can be seen from the figure, the system continues to operate. In other words it is redundant and both paths (incoming cargo and removal of cargo) coexist. The incoming path (solid arrows) from box 501 to the elevator 601 (and from there to the storage level) still functions. Furthermore, the removal path (dotted arrows) in which cargo is extracted from the storage level to the service level (via elevator 601) and from there to the box 501 via buffers 701 continues.

Figure 14C:
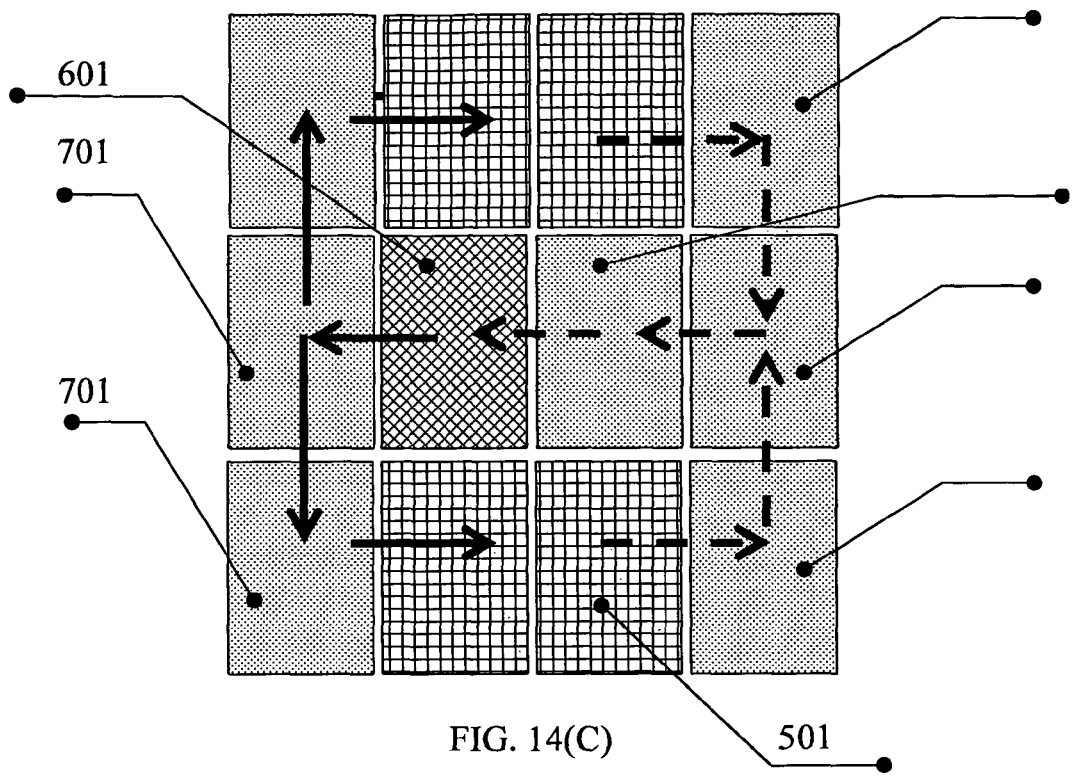
Figure 14D:
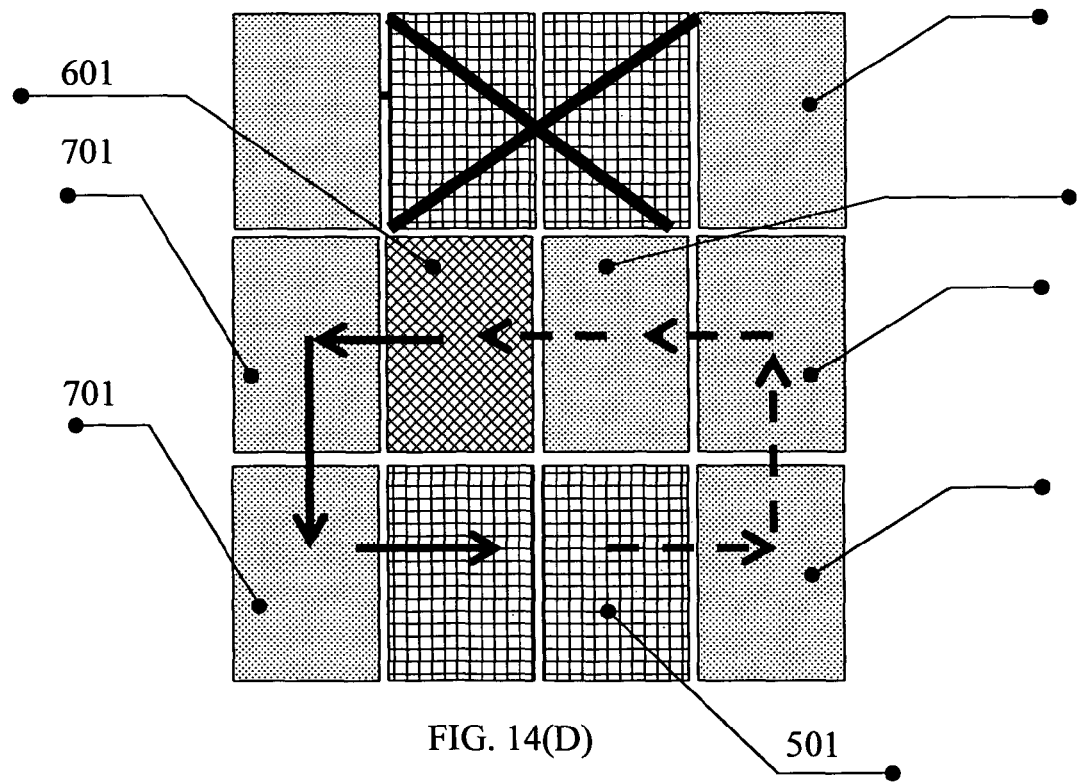

FIG. 14C illustrates again normal mode of the system in which the two paths exists. FIG. 14D illustrates malfunctioning of one box 511. Again, as can be seen from the figure the two path coexist even though the box is inoperable.

The illustrations show each time a regular way to perform a certain task, and an alternative way to perform the same task if there is a malfunction in the box, elevator or buffer. This solution is provided by way of example only and should not be construed to limit the scope of the present invention:

According to another embodiment of the present invention, there is a double service level. Some advantages of using a double service level ("Level X")—constructing "Level X+X"—including two elevators 602, 603 two boxes 502, 503, 504, 505 for each elevator and a two set of blocks and "buffers 1" 702, 712 and "buffers 2" 703. This use is beneficial for significantly increasing system redundancy. In a double system, a malfunction of the elevator, box or buffer does not completely shut down the system. Rather, it is able to continue working using the second elevator, box or buffer to service the entire double service level.

According to another embodiment of the present invention, a control module is provided.

A service level controller or the like may provide conditions for a pallet's status change:

ii. An empty pallet switches status to a loaded pallet after cargo is received on the pallet.

iii. A loaded pallet switches status to empty pallet after cargo is released from the pallet.

iv. A loaded pallet switches status to loaded status again after the release of cargo and receiving a different vehicle instead.

Figure 15:
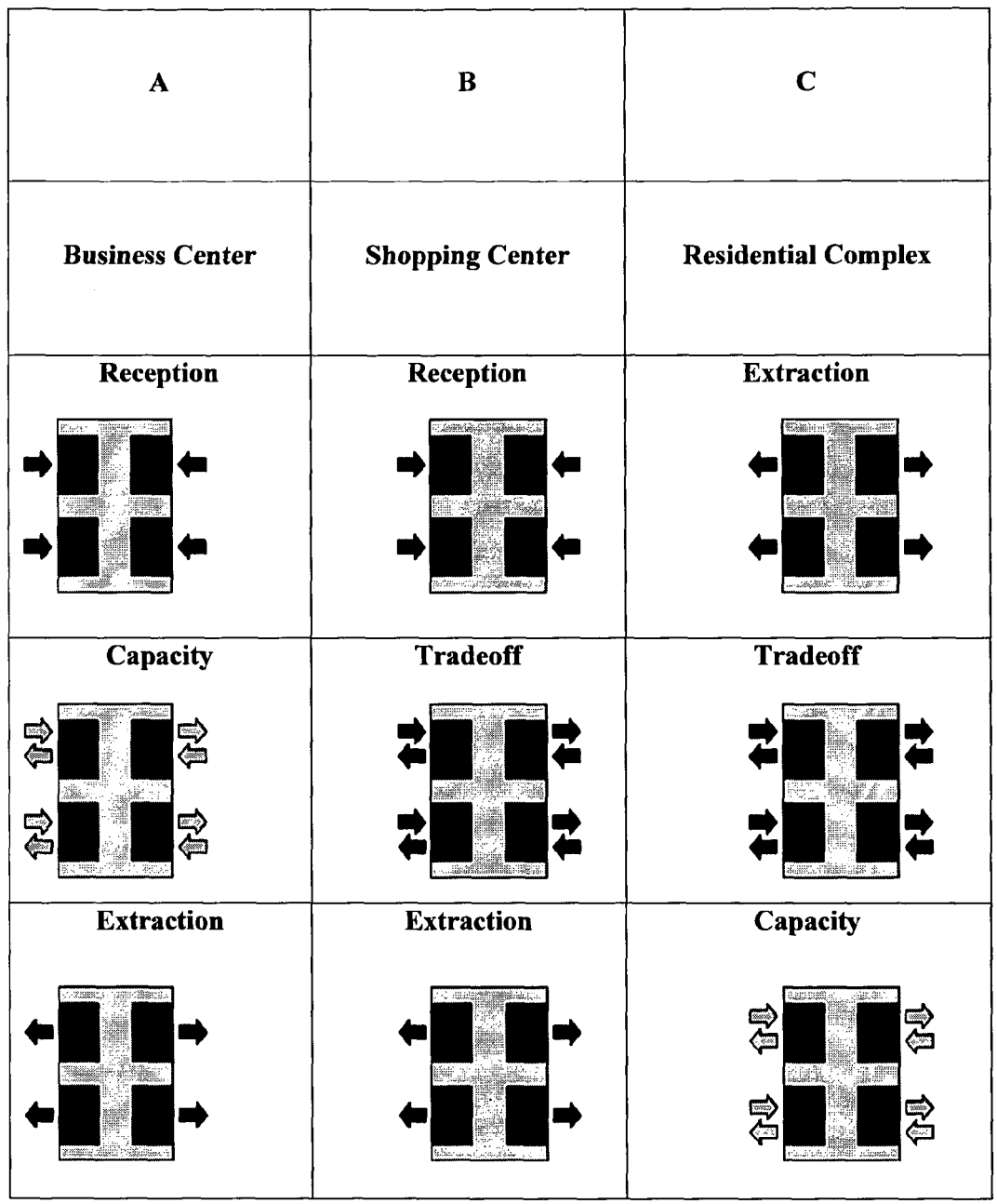
FIG. 15 is a graphical illustration of the use of four modes—reception, extraction, tradeoff and capacity for the three market segments A, B and C. The content of the illustration is parallel to the explanations given in clauses 004-006.

FIG. 15 is a graphical illustration of the use of four modes—reception, extraction, tradeoff and capacity for the three market segments A, B and C (business, shopping, residential) in different stage of the day. The first row illustrates morning time, the second row illustrates afternoon time and the last row illustrates evening time, A capacity mode is a mode at which the storage level is completely or almost completely full. Therefore, the system now utilizes buffers as temporarily storage spaces.

It should be emphasized that the system leaves one elevator, one box free. Further, the system leaves the shorter path from the elevator to the box free for movements of cargo. FIG. 17 is a graphical illustration of the directions in which the logic system can switch between the modes, while taking into account the state of the system (storage levels and service level) and queues for receiving/releasing cargo. FIG. 17 illustrates that all the switches are reversible. It would be appreciated, that every mode can be switched to another mode and switched back, and that the switch between modes may include several steps, and that there may be intermediate phases between the modes. The meaning of each mode defines the operation parameters while the system is, in that mode, including parameters such as extraction and/or reception service time, capacity, etc. For example, if there is a demand mostly to receive cargo, reception mode is used, if there is a demand mostly to release cargo, extraction mode is used. If there is a demand to support cargo traffic in both directions and the required frequency is high per hour in both directions, tradeoff mode is used and if there is a demand for the maximum capacity of the facility and the meaning of service time is insignificant with relation to the capacity, capacity mode is used. According to some embodiments of the invention, various criteria and thresholds may be devised for configuring the system and for specifying when a certain service level should switch from one mode to another. The principles of under what conditions each one of the modes provides certain benefits were discussed above.

According to another embodiment of the present invention, after filling the empty blocks in the storage level, "buffer 1" is filled and is used for temporarily storing cargo and after "buffer 1" is used for storage one of the two boxes is used for storage, in the situation that the system has two boxes.

When switching from capacity mode to any other mode, the reversed sequence is carried out. The system gradually removes pallets from use, while first of all the box is emptied, afterwards "buffer 1" and "buffer 2" and after that storage levels.

According to some embodiments of the invention, a service level includes entrance and exit facilities of the parking facility and may be configured to switch between different modes which are intended for providing efficient cargo reception, efficient extraction, efficient tradeoff (insertion and extraction) and/or enhanced storage capabilities according to varying conditions.

According to further embodiments of the invention, the service level may not be part of the system itself, rather the service level may be that part of the parking or storage facility which the system is intended to manage and control.

According to still further embodiments of the invention, the system may be configured for managing a parking or storage facility as a whole, and may include a module that is intended for managing one or more service levels or service areas.

According to some embodiments of the invention, a service level may include a plurality of storage blocks. Each block is an area, typically rectangular, with a mechanical or robotic mechanism or without any mechanism (FIGS. 4(A), 4(B)), and typically a suitable frame and other infrastructure that allow, together with the pallet (with a mechanical or robotic mechanism or without any mechanism, FIGS. 4(C), 4(D)) the transporting of the pallet from one block to an adjacent block, at least in two directions perpendicular to each other in the area of service level (FIG. 5).

The purpose of the extraction mode is to release cargo one after another that is brought via elevator to the service level and transferred through a box outside. There is an option to transfer received cargo from an elevator to the box through at least one buffer, to release it outside, and to transfer empty pallets back from the same box to the same elevator through at least one buffer but via a different route. These two routes are without any common buffers.

Extraction mode allows the release of a large flow of cargo in a short period of time, for example, for market segments A and C (FIG. 15).

Some embodiments of the invention, relate to a logic system for controlling various aspects of the operation of a service level and storage levels, that allow, while the storage levels are in service time mode, to operate the service level at a tradeoff mode that allows a relatively short service time (fast service) for simultaneous tradeoff (reception and extraction) of cargo, in both service level boxes (assuming that there are two boxes). It would be appreciated that the extraction requests are random and that each received cargo is substantially immediately sent to one of the storage levels for storage therein.

The purpose of the tradeoff mode is to release cargo one after another to a box and through it outside, and in its place to receive in the box new cargo one after another and transfer them to the elevator and through it to the service level.

There is an option to transfer received cargo from a storage level through the elevator to the box via at least one buffer and release it outside, and to transfer back to a storage level, from the same box to the same elevator different cargo that was received instead, through at least one buffer but via a different route. These two routes are without any common buffers.

Tradeoff mode allows short service time of simultaneous reception and extraction of cargo, for example, for market segments B and C (FIG. 16).

Some embodiments of the invention, relate to a logic system for controlling various aspects of the operation of a service level and storage level, that allow, while the storage levels are in a capacity mode, to operate the service level at a capacity mode that allows enhanced storage space utilization, for example, during the night on the expense of service time.

Capacity mode allows optimal storage space utilization, for example, during the night, and further by way of example for market segments A and C (FIG. 15).

Some embodiments of the invention, relate to a logic system for controlling various aspects of the operation of a service level, and for allowing a smooth transfer between all the different modes of operating the service level or between some of the mode (for example, reception mode, extraction mode, tradeoff mode; capacity mode and nay subset thereof, see FIG. 16).

Some embodiments of the invention, relate to a logic system for controlling various aspects of the operation of a service level: (a) that allows the aforementioned four modes of operation and some subsets thereof (reception mode, extraction mode, tradeoff mode, capacity mode or some subset thereof and the different transfers between them), to coordinate their operation with the elevators, boxes (one or two boxes) and buffers. (b) Allows the aforementioned four styles of operation and different subsets thereof (reception mode, extraction mode, tradeoff mode, capacity mode) and the different transfers between them, to enable to insert and/or extract a pallet, which may be part of the process of switching between service time and capacity mode on storage levels, and the switch between reception, extraction, tradeoff and capacity modes on a service level (FIG. 18).

Some embodiments of the invention, relate to logic a system for controlling various aspects of the operation of a service level in such a way that the performance of the processes defined above will continue even if one of the components of the service level [box\es, elevator\s, buffer\s] is temporarily out of use.

The system is built in such a way, that every one of the operating modes has an alternative way to transfer a palette between every two working points of service level. According to some embodiments of the invention, the system may be configured to react to the status of the pallets associated with the system, and the status of the pallets which are part of the system and/or which are associated with the system may be used to determine, for example, the desired operation mode.

According to further embodiments of the invention, the system may be sensitive to other parameters as well, for example, the system may be sensitive to the size of a queue of cargo waiting to be admitted into the parking facility and/or in accordance with another example, the system may be sensitive to the time of day to determine the desired operation mode of the system.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. An automated cargo storage, receiving and retrieval system comprising:
   a. at least one storage area with one or more storage spaces adapted to store stocks of cargo being inserted into said system until said stocks of cargo are being extracted from said system; and,
   b. at least one service area, said at least one service area adapted to receive stocks of cargo being inserted into said system, transfer said stocks of cargo to said storage area, and to retrieve said stocks of cargo being extracted out of said system, said service area comprising:
   a. a plurality of pallets adapted for conveying said cargo within said system, said pallets having at least two states: a loaded state with cargo on the same; and, an empty state without cargo on the same;
   b. a matrix of blocks, said blocks being of predetermined shape upon which said cargo and said pallets are located; said matrix of blocks comprising:
      i. at least one elevator block for transporting said pallet to different areas of said system;
      ii. at least one box block comprising:
         a. at least one insertion/extraction block set; said at least one insertion/extraction block set comprising:
            i. one or more adjacent blocks;
            ii. means adapted to receive entering cargo into said system upon said pallets; and,
            iii. means adapted to release said cargo from said system;
      iii. at least two buffer blocks, at least one of said at least two buffer blocks being adapted to transport empty pallets, and at least one of said buffer blocks being adapted to transport loaded pallets, said at least two buffer blocks being adapted to allow transport of said pallets in at least two orthogonal directions of said at least one service area;
   wherein said pallets, said at least one elevator block, said at least one box block, and said at least two buffer blocks are adapted to perform said storage, receiving and retrieval of said cargo in a sequence such that said cargo can be received into said system and other cargos can be extracted from said system simultaneously; further wherein said at least one of said buffer blocks which is adapted to transport empty pallets is further adapted to store empty pallets, and to provide empty pallets for receiving said cargo within said system;
   wherein said system is characterized by having three modes of operation, selected from the group consisting of:

i. a reception mode, in which said system is adapted to allow the reception of a large flow of cargo in a short period of time, said reception mode adapted to:
   (a) receive said loaded pallets with cargo into said at least one insertion/extraction block set, and transfer said loaded pallets through said at least one elevator block to said storage area of said system via said plurality of transport blocks; and,
   (b) transfer empty pallets through said at least one elevator block to said at least one insertion/extraction block or to one of said at least two buffer blocks via substantially different blocks, reception mode further characterized in that insertion/extraction blocks in said at least one insertion/extraction block set receive cargo;

ii. an extraction mode, in which said system is adapted to allow the release of a large flow of cargo in a short period of time, said extraction mode adapted to:
   a) serially release cargo from said storage area of said system via said plurality of transport blocks through said at least one insertion/extraction block set; and,
   b) transfer empty pallets back from said at least one insertion/extraction block set to one of said at least two buffer blocks via substantially different blocks, extraction mode further characterized in that insertion/extraction blocks in said at least one insertion/extraction block set extract cargo;

iii. a tradeoff mode, in which said system is adapted to support cargo traffic in both directions, said tradeoff mode adapted to simultaneously:
   (a) release said cargo through one of said insertion/extraction block sets out of said system; and,
   (b) receive new cargo through another insertion/extraction block set for storage whilst using different transport routes for said storage and said release of said cargo;

further wherein a controller operates in at least one of said three modes at any given time, said mode selected according to the service pattern characterized by the storage and removal rate at the time.

2. The system of claim 1, wherein said service area is adapted to continue operation even in the case of failure of fewer than all of said elevator blocks, fewer than all of said box blocks, fewer than all of said buffer blocks, or any combination thereof.

3. The system of claim 1, wherein said elevator comprises exit and entrance openings in more than one direction to enlarge the possibilities of transporting said pallets, such that additional transporting paths are provided.

4. The system of claim 1, wherein said controller is adapted for controlling the movements of said plurality of pallets within said system.

5. The system of claim 4, wherein said controller is adapted to cause said plurality of pallets to move in said matrix of blocks.

6. The system of claim 4, wherein said controller is adapted to prioritize pending extraction requests for extracting said cargo from the storage spaces and/or to assign pending insertion requests to the storage spaces in accordance with predetermined criteria; said predetermined criteria is selected from a group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

7. The system of claim 1, wherein a controller is adapted to switch between said reception mode, said extraction mode and said tradeoff mode according to predetermined criteria; further wherein said predetermined criteria is selected from the group consisting of: block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

8. A method for operating a service area in an automated cargo storage, receiving and retrieval system, comprising steps of:
   a. providing said automated cargo storage, receiving and retrieval system comprising
      (a) at least one storage area with one or more storage spaces, adapted to store stocks of cargo being inserted into said system until said stocks of cargo are being extracted from said system; and,
      (b) least one service area; said at least one service area adapted to receive stocks of cargo being inserted into said system and to retrieve stocks of cargo being extracted out of said system;
   said service area comprising:
   (i) a plurality of pallets for conveying said cargo within said system; said pallets are characterized by at least two states: a loaded state with cargo on the same; and, an empty state without cargo on the same;
   (ii) a matrix of blocks, said blocks being of predetermined shape upon which said cargo and said pallets are located; said matrix of blocks comprising:
      (1) at least one elevator block for transporting said pallet to different areas I bullets or numbering of said system;
      (2) at least one box block comprising at least one insertion/extraction block set; said at least one insertion/extraction block set comprising one or more adjacent blocks, said at least one insertion/extraction block set is provided with means adapted to receive entering cargo into said system upon said pallets, and means adapted to release said cargo from said system;
      (3) at least two buffer blocks, at least one of said at least two buffer blocks being adapted to transport empty pallets, and at least one of said buffer blocks being adapted to transport loaded pallets, said at least two buffer blocks being adapted to allow transport of said pallets in at least two orthogonal directions of said at least one service area;
   b. receiving incoming cargo at said at least one insertion/extraction block set by loading said cargo on said plurality of pallets;
   c. transporting said plurality of pallets through said at least one elevator block to said storage area via a predetermined path A;
   d. storing said cargo in said storage area;
   e. transporting said cargo on said plurality of pallets through said at least one elevator block from said storage area to insertion/extraction block set in said service area in a predetermined path B, wherein said path A is substantially different than path B used in said step (c);

f. releasing said cargo from said insertion/extraction block sets of said cargo storage, receiving and retrieval system;

wherein said steps (b) through (f) performed in a at least one mode selected from a group consisting of:

(i) a reception mode, in which said system is adapted to
(a) receive said loaded pallets with cargo into said at least one insertion/extraction block set, and transfer said loaded pallets through said at least one elevator to said storage area of said system via said plurality of transport blocks; and
(b) transfer empty pallets through said at least one elevator block to said at least one insertion/extraction block or to one of said at least two buffer blocks via substantially different blocks;

(ii) an extraction mode, in which said system is adapted:
(a) serially release cargo from said storage area of said system via said plurality of transport blocks through said at least one insertion/extraction block set; and,
(b) transfer empty pallets back from said at least one insertion/extraction block set to one of said at least two buffer blocks via substantially different blocks; and, (ii) a tradeoff mode, in which said system is adapted to support cargo traffic in both directions, said tradeoff mode adapted to simultaneously:
(a) release said cargo through one of said insertion/extraction block sets out of said system; and,
(b) receive new cargo through another insertion/extraction block set for storage whilst using different transport routes for said storage and said release of said cargo;

further wherein said steps of transporting, releasing and receiving are performed in a sequence such that a stock of said cargo can be received into said system and a stock of cargo can be extracted from said system simultaneously; further wherein said steps (e) is performed by substantially different path than those used in said step (g).

9. The method of claim 8, wherein said steps of (c) and (e) of transporting said plurality of cargo to and from said storage area further comprising steps of raising or lowering said plurality of pallets to different areas of said system via said at least one elevator block.

10. The method of claim 8, additionally comprising step of providing said elevator with exit and entrance openings in more than one direction to enlarge the possibilities of transporting said pallets, thereby transporting said plurality of pallets by using additional paths.

11. The method of claim 8, additionally comprising step of controlling the movements of said plurality of pallets within said system.

12. The method of claim 8, additionally comprising step of independently moving said plurality of pallets within said system.

13. The method of claim 8, additionally comprising steps of:
(a) switching between said reception mode, said extraction mode and said tradeoff mode according to predetermined criteria; or,
(b) selecting said predetermined criteria from the group consisting of block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

14. The method of claim 8, additionally comprising step of prioritizing pending extraction requests for extracting said cargo from the storage spaces and/or to assigning pending insertion requests to the storage spaces in accordance with predetermined criteria.

15. The method of claim 14, additionally comprising step of selecting said predetermined criteria from a group consisting of: block(s) vacancy parameters, the existence or the lack thereof of pending extraction requests, the amount of pending extraction requests, the average pendency time of extraction requests, the existence or lack thereof of pending insertion requests, the amount of pending insertion requests, the average pendency time of insertion requests, current status of the storage area, current status of the service area, reaction time of said elevator, usage history of the system.

* * * * *